US012563595B2

(12) United States Patent
Viger et al.

(10) Patent No.: US 12,563,595 B2
(45) Date of Patent: Feb. 24, 2026

(54) METHODS AND APPARATUSES FOR SYNCHRONIZATION IN A MULTI-AP COORDINATION

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 17/928,208

(22) PCT Filed: May 28, 2021

(86) PCT No.: PCT/EP2021/064314
§ 371 (c)(1),
(2) Date: Nov. 28, 2022

(87) PCT Pub. No.: WO2021/239930
PCT Pub. Date: Dec. 2, 2021

(65) Prior Publication Data
US 2023/0217491 A1    Jul. 6, 2023

(30) Foreign Application Priority Data

May 29, 2020    (GB) ..................................... 2008109

(51) Int. Cl.
*H04W 74/0816* (2024.01)
*H04W 74/08* (2024.01)

(52) U.S. Cl.
CPC ... *H04W 74/0816* (2013.01); *H04W 74/0891* (2013.01)

(58) Field of Classification Search
CPC ......... H04W 74/0816; H04W 74/0891; H04W 56/0015
See application file for complete search history.

(56) References Cited

U.S. PATENT DOCUMENTS

2005/0053037 A1 * 3/2005 Ginzburg .............. H04W 24/00
                                                    370/333
2007/0127424 A1    6/2007 Kwon et al.
(Continued)

FOREIGN PATENT DOCUMENTS

CN         1543731 A     11/2004
CN       107211452 A      9/2017
(Continued)

OTHER PUBLICATIONS

Oren Kedem, Multi-AP Operation-Basic Definition, IEEE Draft, IEEE-SA Mentor, XP068167907, vol. 802.11 EHT, 802. 11be, No. 1 May 14, 2020; p. 1-20, (URL: https://mentor.ieee.org/802.11/dcn/ 20/11-20-0617-01-00be-multi-ap-operation-basic-definition.pptx) (Retrieved on May 14, 2020).
(Continued)

*Primary Examiner* — James P Duffy

(74) *Attorney, Agent, or Firm* — Canon U.S.A., Inc. IP Division

(57) ABSTRACT

In a 802.11be multi-AP collaboration, collaborated BSSs obtaining shared resource from a collaborator AP. Co-channel interferences arise from misalignment of PHY preambles between the various collaborated and collaborator BSSs. This misalignment results from the independency of each BSSs during the shared TXOP. To overcome this deficient situation, a synchronization frame is sent by the collaborator AP at a predefined sync time over the shared frequency bands, even if the collaborator AP does not belong to the BSSs operating on these bands. The predefined sync time may derive from the UL Length field specified in the initial trigger frame. Consequently, all the stations are ready to receive the synchronization frame and therefore to start again their MU or P2P transmission a SIFS after the synchronization frame. PHY preambles in adjacent channels are therefore fully aligned.

9 Claims, 10 Drawing Sheets

(56)      References Cited

U.S. PATENT DOCUMENTS

| | | | |
|---|---|---|---|
| 2010/0046430 A1 | 2/2010 | Naito et al. | |
| 2012/0163349 A1* | 6/2012 | Fontaine | H04W 72/1263 |
| | | | 370/336 |
| 2015/0063327 A1 | 3/2015 | Barriac et al. | |
| 2019/0373599 A1* | 12/2019 | Ghosh | H04W 48/14 |
| 2020/0045555 A1 | 2/2020 | Huang et al. | |
| 2020/0076552 A1* | 3/2020 | Cherian | H04W 72/27 |
| 2020/0252855 A1* | 8/2020 | Polacheck | H04W 56/0015 |
| 2021/0168712 A1* | 6/2021 | Cherian | H04W 72/0446 |

FOREIGN PATENT DOCUMENTS

| | | |
|---|---|---|
| CN | 110602660 A | 12/2019 |
| GB | 2542818 A | 4/2017 |
| WO | 2016028131 A1 | 2/2016 |
| WO | 2019066850 A1 | 4/2019 |

OTHER PUBLICATIONS

Kiseon Ryu, Consideration on multi-AP coordination for EHT, IEEE Draft, IEEE SA Mentor, XP068133493, vol. 802.11 EHT, Nov. 13, 2018, p. 1-9, (URL: https://mentor.ieee.org/802.11/dcn/18/11-18-1982-00-0eht-consideration-on-multi-ap-coordination-for-eht.pptx) (Retrieved on Nov. 13, 2018).

Sungjin Park, Consideration on multi-AP coordination for EHT, IEEE Draft, IEEE-SA Mentor, XP068148191, vol. 802.11 EHT, Mar. 12, 2019, p. 1-18, (URL:https://mentor/ieee.org/802.11/dcn/19/11-19-0448-00-0eht-multi-ap-transmission-procedure.pptx) (Retrieved on Mar. 12, 2019).

Doostnejad et al.; "Uplink Coordinated Multi-AP"; Intel Corporation; IEEE Draft; Doc.: IEEE 802.11-19/1903r0; Nov. 9, 2019; pp. 1-23. Retrieved from the Internet: URL: https://mentor.ieee.org/802.11/dcn/19/11-19-1903-00-00be-uplink-coordinated-multi-ap.pptx [retrieved on Nov. 9, 2019].

* cited by examiner

METHODS AND APPARATUSES FOR SYNCHRONIZATION IN A MULTI-AP COORDINATION

CROSS-REFERENCE TO RELATED APPLICATIONS

This application is the National Phase application of PCT Application No. PCT/EP2021/064314, filed on May 28, 2021 and titled "METHODS AND APPARATUSES FOR SYNCHRONIZATION IN A MULTI-AP COORDINA-TION." This application claims the benefit under 35 U.S.C. § 119 (a)-(d) of United Kingdom Patent Application No. 2008109.7, filed on May 29, 2020 and entitled "METHODS AND APPARATUSES FOR SYNCHRONIZATION IN A MULTI-AP COORDINATION." The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) managing a Basic Service Set (BSS) to schedule MU transmissions, i.e. multiple simultaneous transmissions to or from non-AP stations of the BSS, in the wireless network. For example, one of such MU schemes has been adopted by the Institute of Electrical and Electronics Engineers (IEEE) in the 802.11ax standard, draft version 3.0 (D3.0) of June 2018.

Thanks to the MU feature, a non-AP station has the opportunity to gain access to the wireless medium via two access schemes: the MU scheme and the conventional Enhanced Distributed Channel Access—EDCA (Single User) scheme.

Each BSS defines a main elementary channel of the wireless medium (known as a primary channel, usually a 20 MHz channel or a multiple of 20 MHz channel) on which the stations (including the AP) perform EDCA contention. To increase bandwidth for the forthcoming transmission, the stations can simultaneously contend for additional 20 MHz channels, known as secondary channels. The communication channel thus granted for transmission comprises the primary channel and optionally secondary channels.

The 802.11ax standard allows a MU downlink (DL) transmission to be performed by the AP when gaining access to the wireless medium for a transmission opportunity (TXOP). During the MU DL transmission on the granted communication channel, the AP performs multiple simultaneous elementary transmissions, over so-called resource units (RUs), to various non-AP stations. As an example, the resource units split the communication channel of the wireless network in the frequency domain, based for instance on Orthogonal Frequency Division Multiple Access (OFDMA) technique. The assignment of the RUs to the non-AP stations is signaled at the beginning of the MU Downlink frame, by providing an association identifier (AID) of a non-AP station (individually obtained by each station during its association procedure with the AP) for each RU defined in the transmission opportunity.

The 802.11ax standard also allows a MU uplink (UL) transmission to be triggered by the AP when gaining access to the wireless medium. During the MU UL transmission, various non-AP stations can simultaneously transmit data to the AP over the resource units forming the communication channel. To control the MU UL transmission by the non-AP stations, the AP previously sends a control frame, known as a Trigger Frame (TF). The Trigger Frame allocates the resource units to the non-AP stations of the same BSS, using 16-bit Association IDentifiers (AIDs) assigned to them upon registration to the AP and/or using reserved AIDs designating a group of non-AP stations. The TF also defines the start of the MU UL transmission by the non-AP stations as well as the length thereof.

Synchronization between the stations of the BSS is important because the OFDMA communications are very sensitive. Inter-Symbol Interference (PHY cyclic prefix is corrupted) and loss of orthogonality among subcarriers are known as co-channel interferences.

A synchronization at symbol level for the preambles emitted by the stations is thus required, i.e. a 1 µs synchro is required. PHY oscillators that would ensure acceptable drift (less than 1 µs) over a TXOP are too expensive to be used. Hopefully, in the MU scheme, as the AP is involved in both MU UL and DL transmissions, its own transmissions or acknowledgments regularly resynchronize all the non-AP stations of the BSS, despite the drift of their local oscillator.

Recently, the IEEE 802.11 be draft standard Task Group addresses a so-called Multi-AP technology. The latter aims at providing some degree of collaboration among neighbouring access points (APs managing separate BSSs) in order to have a more efficient utilization of time, frequency and spatial resources available. This is particularly important when the neighbouring APs operate over the same selected communication channel (or channel sufficient close to communicate which each other).

With such a technology, two or more neighbouring APs may share resources in terms of frequency and/or time and, in this way, they prevent interferences.

The AP that initializes and manages the multi-AP collaboration by sharing resources of its granted TXOP is referred to as sharing or coordinator AP. It maintains an AP Candidate Set registering the candidate APs for participating in the collaboration, that have requested to be part of the set. Such APs that participate in the multi-AP collaboration and uses shared resources are referred to as shared or coordinated APs. Corresponding BSS is known as coordinated BSS.

The coordinator AP usually sends a sharing announcement frame that defines which resources are allocated to which coordinated APs. A trigger frame may be used. A coordinated AP can then schedule MU downlink (DL) and/or uplink (UL) transmissions for its associated non-AP stations within the constraints (usually in terms of frequency and time) of its allocated resources. The multi-AP collaboration is preferably dynamic, meaning that different APs of the same multi-AP group may act as the coordinator AP to get the wireless medium and share resources.

Result of the resource sharing, the shared resources allocated to a coordinated BSS become independent to the resources kept by the coordinator AP for its own BSS and to the resources allocated to another coordinated BSS, during the sharing period, for instance the whole TXOP. Although synchronization is achieved at shared resource level (because each AP of each BSS is a synchro reference), a synchronization issue arises at communication channel level because the APs of the various BSSs (coordinator and coordinated ones) are not synchronized and therefore introduce drift between their BSS transmissions. Consequently co-channel interferences occur that may severely affect the transmissions in adjacent channels, up to the loss of the communications.

It is desirable to design more efficient mechanisms to perform synchronized multi-AP operation.

SUMMARY OF INVENTION

It is a broad objective of the present invention to overcome some of the foregoing concerns.

In this context, the invention provides a communication method in a wireless network comprising, at a coordinator device managing a coordinator group of wireless devices:

sending a resource sharing frame to be granted a transmission opportunity, TXOP, the resource sharing frame allocating, for an allocation duration (i.e. time window), a shared frequency band of the granted TXOP to a coordinated group of wireless devices managed by a coordinated device separate from the coordinator device; and at a predefined sync time within the allocation duration (i.e. after a predefined sync duration less than the allocation duration), sending a synchronization frame over the allocated shared frequency band. The shared frequency band may be a 20 MHz channel (or multiple thereof) declared as one or more 802.11ax resource units.

The invention also provides a communication method in a wireless network comprising, at a device of a coordinated group of wireless devices:

receiving a resource sharing frame granting a transmission opportunity, TXOP, to a coordinator device managing a separate coordinator group of wireless devices, the resource sharing frame allocating, for an allocation duration, a shared frequency band of the granted TXOP to the coordinated group;

exchanging, during the allocation duration, data over the allocated shared frequency band with one or more devices of the coordinated group;

wherein a synchronization frame initiated by the coordinator device is received on the allocated shared frequency band at a predefined sync duration within the allocation duration (i.e. not at the starting time nor at the end time of the allocation time window).

Thanks to the synchronization frame, the coordinator device introduces some inter-group synchronization (i.e; at BSS or group level). The communications within the shared frequency band or bands remain independent between the initial resource sharing frame and the synchronization frame, and possibly between each successive synchronization frame. Preambles sent by stations of distinct BSSs after such a synchronization frame become aligned. As a result, co-channel interference in multi-AP coordination is drastically reduced.

Correlatively, the invention also provides a wireless communication device comprising at least one microprocessor configured for carrying out the steps of any of the above methods.

Optional features of embodiments of the invention are defined in the appended claims. Some of these features are explained here below with reference to a method, while they can be transposed into device features.

In some embodiments, the synchronization frame is simultaneously sent over the shared frequency bands allocated, in the resource sharing frame, to (coordinated) groups separate from the coordinator group that have to switch their primary channel to use their allocated shared frequency bands. Such "switching" groups are targeted because the primary channel switching operation is liable to introduce substantive delays, and therefore interferences between channels. Note that optionally, only these groups may be targeted for synchronization, less impacting the other groups/frequency bands (because saving the overhead for the synchronization frame).

In other embodiments, the synchronization frame is simultaneously sent over each shared frequency band allocated, in the resource sharing frame, to a (coordinated) group separate from the coordinator group. This approach ensures that all the frequency bands within the TXOP that become independent remain synchronized with the coordinator device. Note that optionally, only these coordinated groups may be targeted for synchronization, less impacting the resource units for the coordinator group (because saving the overhead due to the synchronization frame).

In yet other embodiments, the synchronization frame is simultaneously sent over all frequency bands being reserved for the granted TXOP. This ensures that all the frequency bands forming the TXOP remain aligned during the whole TXOP duration. Co-channel interferences are further reduced.

In some embodiments, the synchronization frame is simultaneously sent over frequency bands being reserved for the granted TXOP that are adjacent. Adjacent may mean overlapping. This is for example the case for 802.11ax 20 MHz channels which slightly overlap one each other.

Such embodiments focus on frequency bands where the co-channel interferences are the highest and thus more impacting the communications. This approach may mean that no sync frame is sent on the reserved frequency bands that are isolated (in comparison to the other frequency bands of the reserved TXOP) in the punctured common communication channel.

A combination of this approach with the previous ones may be contemplated: synchronization frame sent over the frequency bands allocated to "switching" groups that are adjacent to reserved frequency bands (i.e. except those that are isolated); synchronization frame sent over the frequency bands allocated to separate groups that are adjacent to reserved frequency bands (i.e. except those that are isolated).

In some embodiments, the predefined sync time is defined in the sent resource sharing frame. The coordinated groups may consequently organize their transmission in order to be ready to receive the synchronization frame at the right time. Preferably, the predefined sync time is defined by the "UL Length" subfield of the "Common Info" field of a 802.11 trigger frame acting as the resource sharing frame.

In some embodiments, a subsequent synchronization frame is sent by the coordinator device over the allocated shared frequency band, at a subsequent predefined sync time within the allocation duration, the subsequent predefined sync time being defined in the preceding sent synchronization frame. The coordinator device thus organizes the TXOP in timeslots, each separated from the other by a synchronization frame. Large (in time) TXOP with multi-AP coordination may thus be contemplated to provide large opportunity to the coordinated groups.

Correspondingly at the non-coordinator devices, a subsequent synchronization frame initiated by the coordinator device is received over the allocated shared frequency band, at a subsequent predefined sync time within the allocation duration, the subsequent predefined sync time being defined in the preceding received synchronization frame.

In some embodiments, the resource sharing frame includes a sync field indicating that a synchronization frame is expected at the predefined sync time. This is for the non-coordinator devices to know whether they can immediately start a new transmission within the allocation duration or they have to wait the synchronization frame before starting transmitting again. In this perspective for these non-coordinator devices, upon detecting the received resource sharing frame includes a sync field indicating that a synchronization frame is expected at the predefined sync time, the device waits for the synchronization frame before starting again exchanging data over the allocated shared frequency band with the one or more devices of the coordinated group. Thanks to the sync field, the stations are aware when a synchronization process is implemented.

In some embodiments, the method may further comprise, at the coordinator device, receiving an acknowledgment frame from the coordinated device in response to the sent synchronization frame. The synchronization frame may explicitly require the acknowledgment from the coordinated device, using a dedicated field, for instance the 802.11ax "CS Required" subfield of the trigger frame format. Alternatively, the acknowledgment may be systematic.

Correspondingly at a non-coordinator device, the method may further comprise sending an acknowledgment frame to the coordinator device in response to the received synchronization frame.

In some embodiments, the synchronization frame is one or more of:

a Quality-of-Service_Null, QoS_Null, frame,
a Trigger Frame according to the 802.11ax series with a Trigger Type subfield set to 8 or more,
a Trigger Frame according to the 802.11ax series deprived of User Info fields describing resource unit allocations,
a MAC frame where the TA field is empty or missing,
a copy of the resource sharing frame.

In some embodiments concerning non-coordinator devices, the method may further comprise, at the device (in fact the coordinated device managing the coordinated group), repeating the received synchronization frame. This aims at synchronizing the wireless devices that are out of the transmission range of the coordinator device and did not received the initial synchronization frame.

In this context, for these out-of-range devices, the synchronization frame is received from a coordinated device managing the coordinated group.

For the other devices, the synchronization frame is received from the coordinator device.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS

Figure 1:
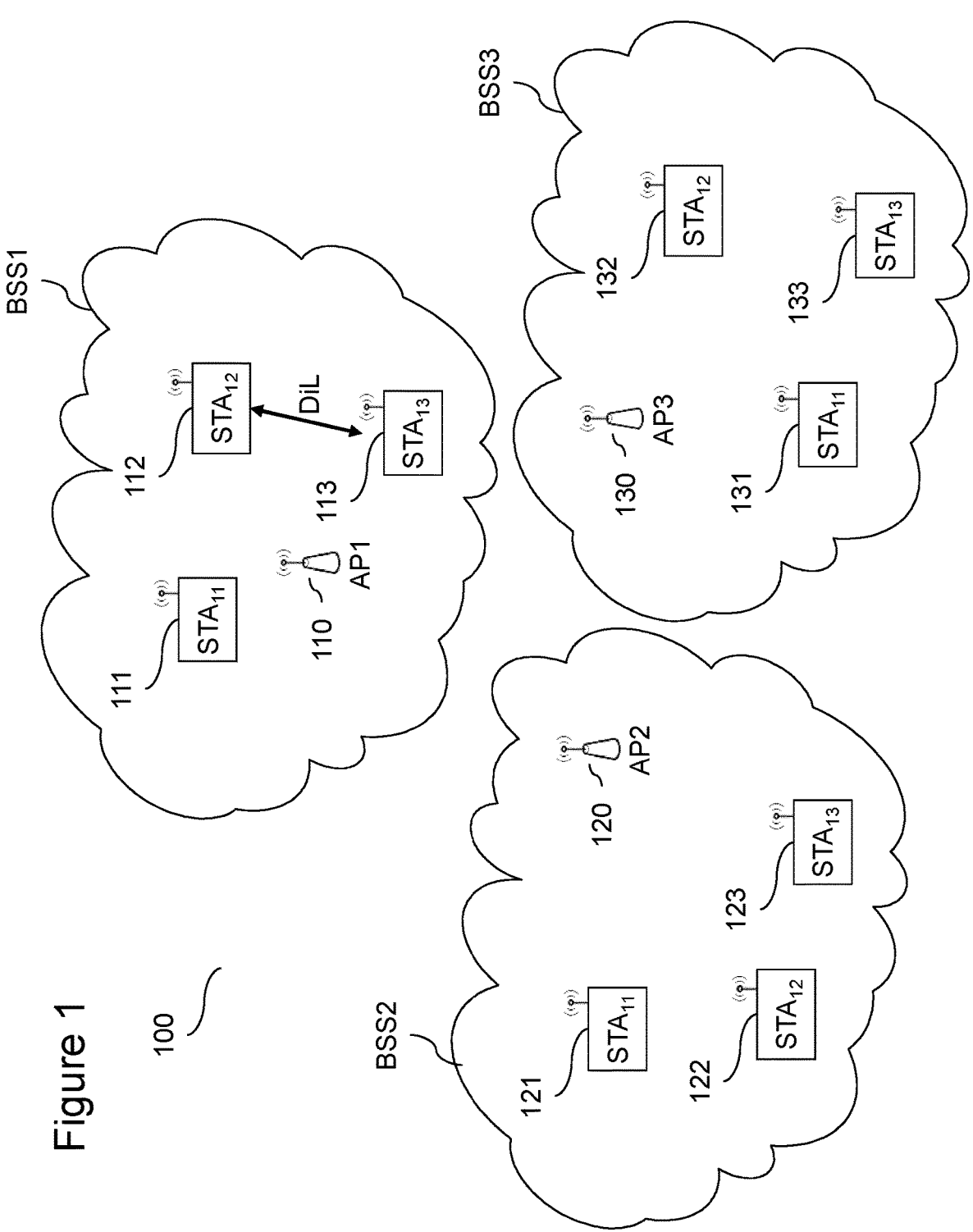
FIG. 1 illustrates an exemplary network environment in which embodiments of the present disclosure may be implemented.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates an exemplary network environment in which embodiments of the present disclosure may be implemented.

The illustrated wireless network environment comprises a multiple AP system 100 formed by a group of neighbouring wireless networks that operate over a common communication channel or wireless medium. The common communication channel may correspond to a part (e.g. 20 MHz) or all of an operating channel (e.g. 20 MHz, 40 MHz, 80 MHz or 160 MHz).

A first wireless network BSS1 comprises an access point (AP) 110 and three non-AP stations (STAs) 111, 112 and 113 associated with the AP 110 (i.e. registered with it). A second wireless network BSS2 comprises an AP 120 and three associated non-AP STAs 121, 122 and 123. A third wireless network BSS2 comprises an AP 130 and three associated non-AP STAs 131, 132 and 133. In the following, BSSx represents any of the wireless networks, while 1×1, 1×2 and 1×3 any of the non-AP stations. Of course, another number of wireless networks and any number of non-AP stations per wireless network can be contemplated. In the present disclosure, APs 110, 120 and 130 are also referred to, respectively, as AP1, AP2 and AP3. A device may act as an AP of one wireless network and at the same time may belong to another wireless network as an associated STA.

The stations (AP and non-AP) of each wireless network exchange data frames over the communication channel 100, under the management of the AP. A primary channel, usually 20 MHz channel, is defined per wireless network on which the management frames are exchanged. The other 20 MHz channels of the communication channel, if any, are known as secondary channels.

Also, direct communications (also known as direct link, DiL) between non-AP STAs can be implemented without the use of the access point (known as an Ad-hoc mode). For instance, WiFi-Direct standard allows devices to communicate directly over the 802.11 wireless medium without the need for any AP. Exemplary situation of direct communications, corresponding to an increasing trend nowadays, is the presence of peer-to-peer (P2P) transmissions between non-AP stations having the same primary channel, e.g. STA 112 and STA 113 illustrated in the Figure. Technologies that support P2P transmissions between non-AP STAs not associated with the same BSS or no BSS include for example WiFi-Miracast (RTM) and Wireless Display scenario, in addition to WiFi-Direct. Other technologies that support P2P transmissions within a BSS include Direct Link Setup (DLS) and Tunneled Direct Link Setup (TDLS). Even if P2P flows are usually not numerous, the amount of data per flow tends to be important, typically low-compressed video, from 1080p60 up to 8K UHD resolutions.

Each non-AP STA 1×1-1×3 registers to the AP 1×0 of one wireless network BSSx during an association procedure. During the association procedure over the primary channel, the AP assigns a specific Association IDentifier (AID) to the requesting station. For example, the AID is a 16-bit value uniquely identifying the station.

The stations (including the AP) compete one against another over the communication channel (including the primary channel and optionally secondary channels to increase bandwidth) using EDCA (Enhanced Distributed Channel Access) contention to access the communication channel in order to be granted a transmission opportunity (TXOP). The TXOP may then be used to transmit (single-user, SU) data frames or to implement multi-user (MU) transmissions. In the MU scheme, a single station, usually the AP of the wireless network BSSx, is allowed to schedule a MU transmission, i.e. multiple simultaneous transmissions to or from other stations of the wireless network. One implementation of such a MU scheme has been for example adopted in IEEE 802.11ax amendment standard, known as the Multi-User Uplink and Downlink OFDMA (MU UL and DL OFDMA) procedures. In the MU scheme, resources are defined over the 20 MHz channel or channels used, known as resource units.

More generally, the resources may include space, frequency and time resources and may be obtained according to different multiplexing schemes. Examples of those schemes include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system.

In the IEEE 802.11 wireless local area networking standards, the multiple AP system 100 may correspond to an extended service set (ESS) and each of the wireless networks to a basic service set (BSS).

Although the description of embodiments of the invention is given in the context of IEEE 802.11, the embodiments are not limited thereto and they may apply to other types of wireless networks and protocols.

Figure 2:
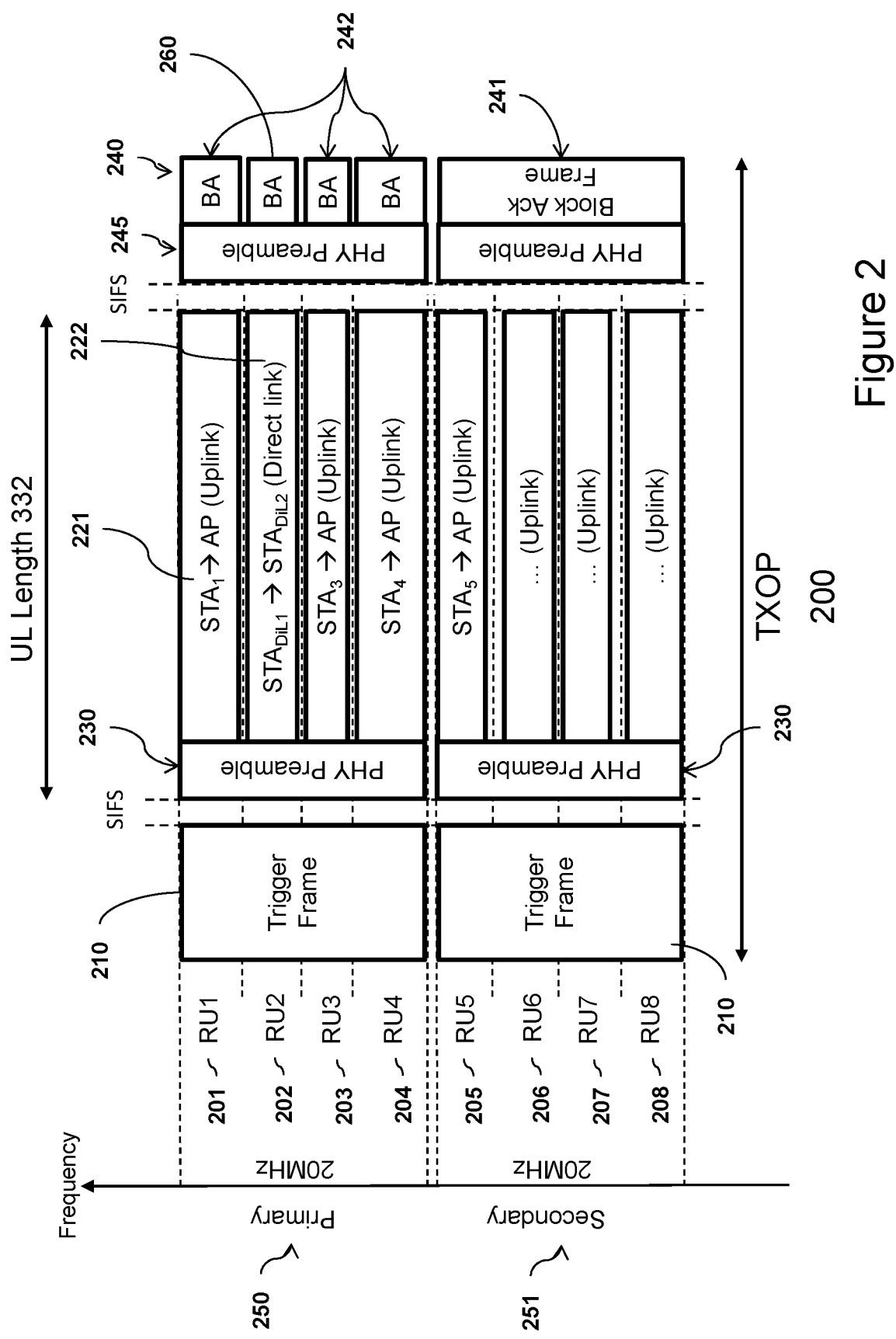
FIG. 2 illustrates a trigger-based (TB) Multi-User (MU) transmission.

FIG. 2 illustrates the MU scheme in any of the wireless networks BSSx, and more particularly a trigger-based (TB) Multi-User (MU) transmission that includes, in addition to MU uplink (UL) transmissions to the AP of BSSx, a MU transmission between non-AP STAs, i.e. a direct link (DiL) transmission.

The illustrated MU transmission is triggered by a trigger frame (TF) 210 reserving the communication channel for a transmission opportunity TXOP 200. The TF is a control frame, for instance in the IEEE 802.11 legacy non-HT format. The TF is sent by the APx over the primary 20 MHz channel 250 when detected as idle and duplicated (replicated) on one or more other (secondary) idle 20 MHz channel 251, if any, forming the communication channel. Due to the duplication of the control frame 210, it is expected that every nearby legacy station (non-HT or 802.11ac stations) receiving the TF on its primary channel (which may be a secondary channel for the BSSx considered), sets its NAV to the value specified in the header of the TF. This prevents these legacy stations from accessing the channels of the reserved communication channel during the transmission opportunity (TXOP).

Figure 3:
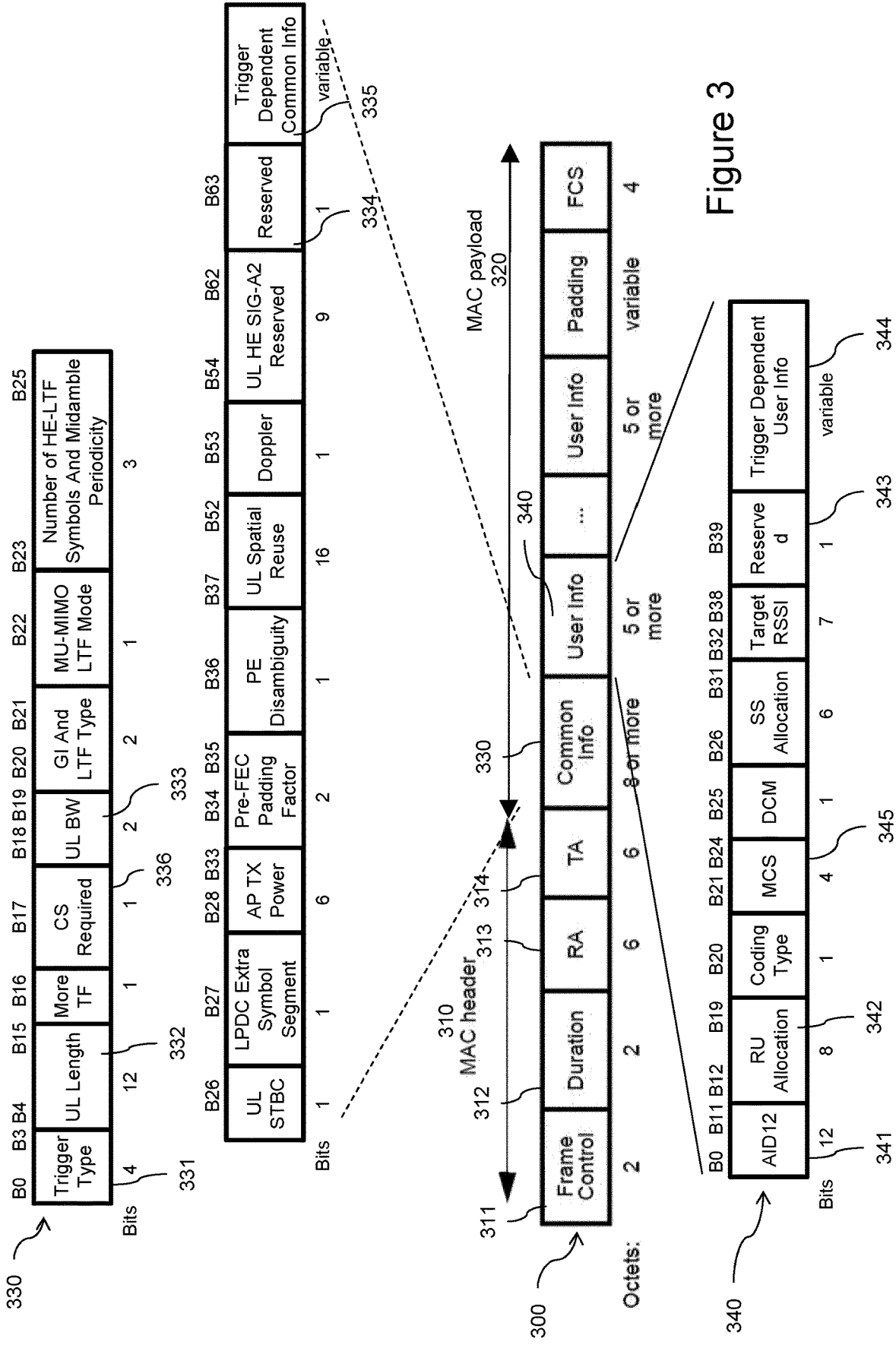
FIG. 3 illustrates the structure of a Trigger Frame.

The TF 210 has the structure shown in FIG. 3. It is a MAC (standing for Medium Access Control) frame 300 made of:

a MAC header 310 with a standardized "Frame Control" field 311, a standardized "Duration" field 312 defining the duration of the transmission opportunity (e.g. TXOP 200), an "RA" field set to a broadcast MAC address for the BSSx 313, and a "TA" field set to a MAC address of the AP transmitting the trigger frame 314, and a MAC payload 320.

The MAC payload 320 includes:

a "Common Info" field 330, one or more "User Info" fields 340, and padding and FCS fields.

The "Common Info" field 330 comprises a "Trigger Type" subfield 331 which specifies the type of the trigger frame. For the time being, eight values (0 to 7) are defined. For instance, a basic TF is signaled by a value 0 in the "Trigger Type" subfield 331.

The "Common Info" field 330 also comprises a "UL Length" field 332 specifying the duration of the solicited UL transmission (preamble 230 plus UL data 221), and a 2-bit "UL BW" field 333 specifying the bandwidth of the communication channel considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth. It ends by a reserved B63 bit 334 and a Trigger Dependent Common Info subfield 335 of variable length, the content of which depends on the "Trigger Type" subfield 320.

As shown in FIG. 2, elementary communication channels, here resources units RUs, are defined across the communication channel used. Basically, each resource unit is allocated to a different non-AP station in the MU scheme.

A resource unit RU1 201 to RU8 208 (more generally RUx) is formed by a group of sub-carriers, preferably adjacent, encompassed in the communication channel. This means that the frequency bandwidth of the communication channel is greater than or equal to that of the resource unit. The RUs may be allocated for scheduled access (the AP decides which non-AP station uses the RU) or random access (non-AP stations contend for access to the RU).

The RUs are defined by the AP in the TF 210. Back to FIG. 3, each "User Info" field 340 corresponds to one of the RUs. Any order of the "User Info" fields 340 can be used within the TF 300 because these fields are self-sufficient to define the RUs and their access schemes.

A "User Info" field 340 includes an "AID12" subfield 341, an "RU Allocation" subfield 342 and ends by a reserved B39 bit 343 and a "Trigger Dependent User Info" subfield 344 of variable length, the content of which depends on the "Trigger Type" subfield 320. Other fields exist that are not explained herewith for concision.

The "AID12" subfield 341 is set to the AID of the non-AP station to which the RU defined in "RU Allocation" subfield 342 is allocated in case of scheduled access or is set to AID=0 or 2045 to offer the corresponding RU to random access to respectively associated and unassociated non-AP stations. The 802.11ax standard (Table 9-31g of version D4.1 of the standard for instance) defines the values to be used in "RU Allocation" subfield 342 to designate a specific RU within the communication channel signaled in "UL BW" field 333.

In the example of FIG. 2, the TF 210 offers RUs to the non-AP stations (RU1 201 and RU3-RU8 203-208) for Uplink (UL) transmissions 221 and also offers a DiL transmission capability 222 within the triggered MU transmission by allocating a resource unit (here RU2 202) to this purpose. Previously, a manager or responsible or "group owner" of a P2P group may have advised the AP that the P2P group is willing to have new opportunity to DiL transmissions.

DiL transmission offered by the AP may be signaled in the associated "User Info" field 340 (i.e. the field corresponding to the offered RU) by using an appropriate value in the "AID12" subfield 341.

In one implementation, the "AID12" subfield 341 may convey a DiL session identifier corresponding to the direct link session (that the source and destination stations involved in the direct link communication can directly identify). This can be envisaged when the AP has allowed the P2P session (like for DLS protocol if within its BSS) or alternatively is aware of P2P protocol (outside its BSS and discovered through beacon frames or discovery frames of the coordinated scheme) and has granted an identifier to the session. Preferably, the DiL session identifier is constrained to the AID format of 12 bits; it is then up to the AP to allocate values distinct from those assigned to AIDs identifying individual non-AP stations.

Alternatively, the "AID12" subfield 341 may convey an AID of a non-AP station of the P2P group, for instance the group owner of the P2P group. Alternatively, as the AID may not be known by the non-AP 802.11ax station of the P2P group, a MAC address may be used instead of a station identifier (AID), because this kind of address is universally known and more especially shared with the AP and the stations. In variants, the two AIDs (if any) or the two MAC addresses of the non-AP stations involved in the DiL session can be indicated in the User Info field (using for instance the AID12 subfield 341 and/or the Trigger Dependent User Info section 344).

Back to FIG. 2, as a consequence of receiving the TF 210, the non-AP stations start the MU transmission (for UL or DiL transmission) a SIFS after the TF. They start sending their data frames in the High-Efficiency (HE) format introduced in 802.11ax.

High-Efficiency (HE) frames have been introduced in 802.11ax. As shown in FIGS. 4, these frames start with the same preamble 230 (L-STF, L-LTF and L-SIG) readable by any station (for backward compatibility), and continue with a complementary preamble and a Data field. The HE fields of the preamble can only be decoded by 802.11ax (and forward compatible) devices and are included in various types of HE frames, for example, HE single user (SU) PPDUs used for single user transmissions, HE MU (Multi-User) PPDUs used for transmissions to one or more stations, in particular for MU downlink (DL) transmissions from the AP to non-AP stations, and HE trigger-based (TB) PPDUs (HE_Trig) used for uplink (UL) transmissions from non-AP stations to the AP, in response to a trigger frame.

Figures 4A, 4B, 4C:
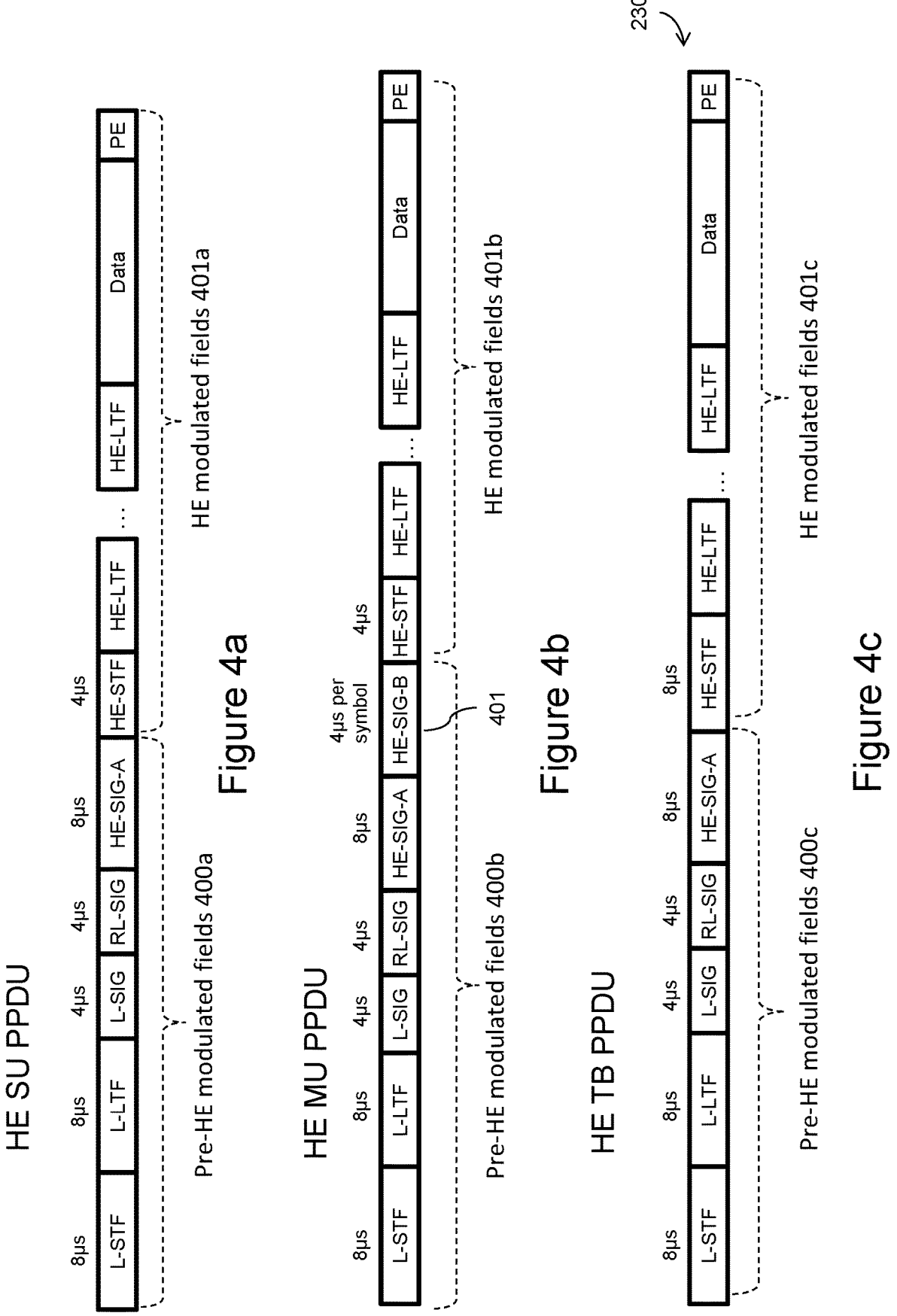
FIG. 4a illustrates the format of a HE SU PPDU.
FIG. 4b illustrates the format of a HE MU PPDU.
FIG. 4c illustrates the format of a HE TB PPDU.

FIGS. 4a, 4b and 4c illustrate the format of these various frames, respectively, HE SU PPDU, HE MU PPDU and HE TB PPDU frames. These HE frames as used as examples when describing embodiments of the invention. However, other formats can of course be contemplated. For example, Extremely-High-Throughput (EHT) frames introduced in 802.11be may well be used too.

FIG. 4a illustrates the format of a HE SU PPDU. It includes a legacy preamble (L-STF, L-LTF, L-SIG with RL-SIG), an HE preamble made of HE-SIG-A (HE SIGNAL A), HE-STF (HE Short Training Field) and HE-LTF (HE Long Training Field), and ends with the Data and PE (Packet Extension) fields. Legacy preamble and HE-SIG-A (referenced together as fields 400a) are duplicated on each 20 MHz channel used in the communication channel. The HE-SIG-A field includes multiple subfields indicating at set of transmission parameters of the PPDU, such as bandwidth (BW), a modulation and coding scheme (MCS), a number of data streams, a coding type, etc. The next fields 401a are modulated over the channel bandwidth.

FIG. 4b illustrates the format of a HE MU PPDU. It includes the same fields as HE SU PPDU (FIG. 4a), with an additional field 401, namely HE-SIG-B (HE SIGNAL B), used to tell the non-AP stations in which resource unit they will find their data (i.e. the allocations of the RUs to the non-AP stations). This is because the DL transmission directly starts without a previous triggering frame announcing the allocation of the RUs. HE-SIG-B 401 thus defines how the RUs forming the DL MU transmission are assigned to the non-AP stations, for the latter to efficiently receive their own data from the AP. Again, fields 400b are duplicated on each 20 MHz channel, while for fields 401b, HE-STF and HE-LTF are modulated over the channel bandwidth whereas the Data are modulated on the RU concerned only.

FIG. 4c illustrates the format of a HE TB PPDU (HE-Trig). This is the format used for data frames (preamble 230 and data 221) of FIG. 2. Each HE-Trig PPDU carries a single transmission (i.e. from one non-AP station) in response to the trigger frame. The HE-Trig frame has a format quite similar to the one of HE SU PPDU, except the duration of the HE-STF field is 8 µs. In particular, it does not include an HE-SIG-B field because the RU allocation to non-AP stations has already been defined by the TF 210. Again, fields 400c are duplicated on each 20 MHz channel, while for fields 401c, HE-STF and HE-LTF are modulated over the channel bandwidth whereas the Data are modulated on the RU concerned only.

DiL transmissions are based on the HE SU PPDU format if the DiL takes place on an entire 20 MHz channel or a multiple thereof, or on the HE TB PPDU format for the case where the transmission takes place on a subpart of a 20 MHz channel.

Conventional MU transmission imposes that preamble 230 is the same for all transmissions. More precisely for 802.11ax the pre-HE modulated fields 400c (composing the preambles 230) must be exactly the same and are simultaneously emitted on each 20 MHz band of the communication channel used. This includes the preamble of the DiL transmission made by a non-AP station to a destination DiL non-AP station.

Once the stations have used the scheduled and/or random RUs to transmit data to the AP, the AP responds with a Multi-User acknowledgment to acknowledge the data received on each RU. Acknowledgment frame 240 can follow the NON_HT PPDU format (241) to perform a block acknowledgment or the HE MU PPDU format (242) when sent on an OFDMA RU to perform an RU-based acknowledgment.

For the DiL transmission, it may be envisioned that the destination DiL non-AP station emits an acknowledgment frame 260 over the same RU as the one used for the DiL transmission 222. Acknowledgment frame 260 can follow the SU format (FIG. 4a).

Each wireless device has its own oscillator, independent to the other devices, based on which it calculates the timing of its communication operations. To keep the cost of the devices low, communication receivers usually use low-cost oscillators which inherently have some drift.

Timing synchronization is the process by which a wireless device determines the correct instants of time at which to sample the incoming signal. Carrier synchronization is the process by which a wireless device adapts the frequency and phase of its local carrier oscillator with those of the received signal. In this respect, synchronization between the wireless devices is important to avoid inter-Symbol Interferences (PHY cyclic prefix is corrupted) and losses of orthogonality among subcarriers are known as co-channel interferences.

Hopefully, in conventional systems such as 802.11ax that rely on Multi-User OFDMA (uplink/downlink) communications, multiple non-AP stations communicate with a common single sender/receiver, the AP, that regularly ensures the re-synchronization between the stations. The AP estimates and compensates the effect of multiple Time Offsets (TOs) and multiple Carrier Frequency Offset (CFOs) in order to decode information from each user.

Multi-AP technology has emerged where the APs 110, 120, 130 collaborate to share the common communication channel once one of them is granted access to it. The APs exchange messages one with each other to coordinate multi-AP communications, i.e. to avoid interference.

Multi-AP sharing of the common communication channel is resource-based. An amount of a shared resource can be measured in time units, frequency band width, number of streams, amount of data or traffic (e.g. number of bytes) and/or any other suitable unit, depending on the type of resources as defined above. For instance, frequency-organized RUs as shown in FIG. 2 can be shared, meaning that a first AP may offer one or more RUs to other APs. In this perspective, "shared resources", "shared frequency band", "shared channels" and "shared resource units" are synonyms and designate those resources offered by the coordinator AP to another AP through the multi-AP technology.

To coordinate the multi-AP communications, the APs may be part of an inter-AP coordination group, the formation of which is out of scope of the present invention. As an example, the APs willing to collaborate may previously issue management frames, like beacons or dedicated broadcasted frames, to advertise the other APs of their multi-AP coordination capability. The coordination group is also referred to as the AP Candidate Set for the multi-AP sharing.

Figure 5:
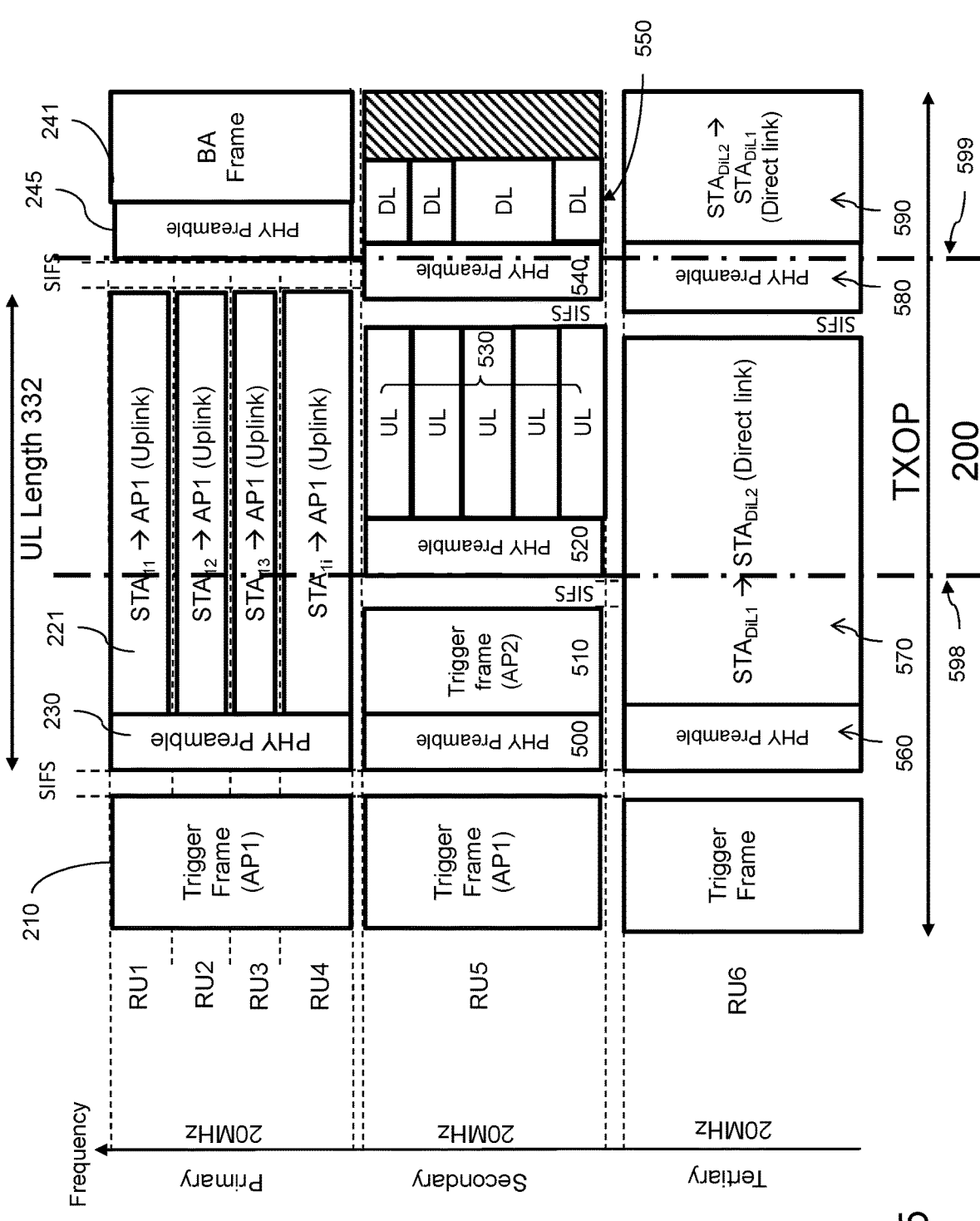
FIG. 5 illustrates a transmission sequence implementing the multi-AP technology to achieve coordinated OFDMA resource sharing.

FIG. 5 illustrates a transmission sequence implementing the multi-AP technology to achieve coordinated OFDMA resource sharing. It is based on 802.11ax frames. However, it may use equivalent frames.

The trigger frame 210 has a non-HT duplicate format, and is replicated on each 20 MHz channel forming the common communication channel (e.g. 40 MHz for the sake of illustration).

The trigger frame 210 sent from a coordinator or "sharing" AP (AP1 for the sake of illustration) is configured to trigger an MU transmission for another wireless network (BSS2 managed by AP2 for the sake of illustration), i.e. to initiate a multi-AP coordination to share part of its TXOP with other BSSs. To this end, the trigger frame 210 allocate one or more resource units of the reserved communication channel (here a single resource unit, RU5, having a 20 MHz width) to the other wireless network. In this perspective, the trigger frame 210 acts as a frame announcing the sharing of resources of the granted TXOP.

In the exemplary sequence shown, the TF 210 sent by AP1 allocates the resources units of its primary 20 MHz channel to non-AP STAs (STA$_{12}$, STA$_{12}$, STA$_{13}$, STA$_{1i}$) of its own wireless network (i.e. of BSS1). Conventional MU UL transmissions 221 therefore take place on the primary 20 MHz channel of the BSS: each of non-AP STAs (STA$_{11}$, STA$_{12}$, STA$_{13}$, STA$_{1i}$) emits an UL frame according to the HE TB PPDU format (FIG. 4c), where all pre-HE modulated fields 400c (forming the preamble 230) are emitted by these stations over the primary 20 MHz channel only.

In addition to conventional MU UL RUs, one or more resource units of the MU transmission are allocated to another wireless network (AP2 of BSS2 in the example) managed by another AP (AP2). From coordinator AP's perspective, the other AP (AP2) is considered as a mere device, e.g. a station unassociated with the coordinator AP (AP1), i.e. usually without an AID assigned to it by the coordinator AP. The other AP is referenced coordinated or "shared" AP and will manage the shared resource allocated, by the coordinator AP, to its BSS.

The allocation of the resource units to coordinated AP AP2 is signaled, by AP1, in the TF 210. As no AID known by AP1 exists for AP2, a dedicated identifier may be used to fill in the "AID12" subfield 341 of the corresponding "User Info" fields 340. For instance, the MAC address of the coordinated AP or the BSSID of the coordinated BSS may be used to signal that the resource unit is allocated to the coordinated AP/BSS (AP2/BSS2).

Such allocated resource units each occupies a frequency band made of a multiple of 20 MHz channels (e.g. 20, 40, 60, 80 MHz and so on.). In other words, multi-AP technology preferably subleases 20 MHz channels. The shared frequency band may be continuous or punctured, and may be adjacent to the primary channel of BSS1 or not.

As mentioned previously, each wireless network BSSx defines its own primary 20 MHz channel on which contention is performed by the stations of this network. The shared frequency band may or not include the primary 20 MHz channel of coordinated BSS (here BSS2). When the shared frequency band does not include the primary 20 MHz channel of BSS2, AP2 and the non-AP stations of BSS2 have to temporarily switch their primary 20 MHz channel (until the end of the resource sharing) in order to efficiently communicate together on this shared band.

The "new" (and temporary) primary 20 MHz channel for the coordinated BSS (BSS2) may be defined by the coordinator AP (AP1) in the TF 210 (using appropriate flag) or be defined by rules known by all stations of the coordinated BSS.

The coordinated AP (AP2) uses the resource units of the MU transmission allocated to its BSS (RU5 in the example) to manage data exchange within its BSS (BSS2), in particular between non-AP stations of BSS2 and AP2.

Recursively, AP2 may sublease one or more 20 MHz channels of the shared resource units so obtained, to a station outside BSS2, for instance to another AP such as AP3. In that case, AP2 becomes a coordinator AP for AP3. As an example, when the coordinated device (AP2) is a transmitted BSSID AP of a physical AP, it may further allocate some of the shared frequency band to its non-transmitted BSSIDs.

When managing data exchange within the shared resources of the coordinated transmission, the coordinated device can transmit data frames using a single-user (SU) format because the shared frequency band is made of one or more entire 20 MHz channels, but may also transmit data frames using a multi-user (MU) format or mix both. The SU format used may be the HE SU PPDU format in accordance with IEEE 802.11ax standard (FIG. 4a); the MU format used may be the HE MU PPDU format in accordance with IEEE 802.11ax standard (FIG. 4b) (alternatively, an EHT MU PPDU format could be envisaged according to IEEE 802.11be standard). In the MU format case, the frame (preamble) has an HE-SIG-B field that contains additional information (such as the identifier of the transmitter, namely the coordinated AP) that can be used by the recipient of the frame to quickly (i.e. even before the data field of the frame is received) determine the transmitter of the PPDU. This helps the non-AP stations to correctly identify if the frame has to be processed (if it comes from the local AP).

For instance, the MU scheme as explained with reference to FIG. 2 may be implemented within those shared resource units (RU5 in the example).

The coordinated AP (AP2) thus issues a Trigger Frame 510 (in SU or MU format) in order to trigger a (second) MU UL transmission from non-AP stations of the second BSS (BSS2) over the allocated shared resource units of the (first) MU transmission triggered by the coordinator AP (AP1). The coordinated AP (triggered by AP1 through the TF 210) becomes a triggering AP for the non-AP stations of BSS2. The TF 510 defines an own Duration 312 (within the limit of TXOP defined by Duration 312 of the TF 210) and an own UL Length 332 for the MU UL transmission 530 of the non-AP stations of BSS2.

Next, non-AP stations of BSS2 receive the TF 510 sent by AP2, determine from TF 510 whether they are allocated RUs within the shared frequency band (RU5 in the example). Note that the RUs defined in TF 510 are encompassed within and may be subparts of the shared RUs as defined in TF 210. The non-AP stations of BSS2 may then emit their triggered UL frames 530 (with preamble 520).

A MU Downlink frame (550—together with its preamble 540) may also be conveyed inside the shared frequency band granted by AP1, in which AP2 may send several AMPDUs for multiple non-AP stations of its BSS (BSS2).

The PHY preambles 500-520-540 may have the same frequency width as the related data 510-530-550, that is to say a 20 MHz width in the example.

As shown in FIG. 5, the MU transmission within the coordinated BSS (BSS2) may be shorter in time than the one made within the coordinator BSS (BSS1)— see hatched portion. In that case, the coordinated AP (AP2) may send padding signal in order to maintain energy on the shared frequency band over the whole TXOP.

At the end of the MU transmission in the shared frequency band, the stations of the coordinated BSS (BSS2) switch back to their original primary 20 MHz channel (if temporary switch has been made).

Similar to the allocation of RUs to DiL transmissions (see 222 in FIG. 2), the sharing of resources can be made to the benefit of a P2P group which can organize itself to perform DiL transmissions within the shared resources. In that case, the coordinated device is a P2P device (and not an AP), for instance an owner or manager of the P2P group.

This is illustrated by RU6 occupation in the Figure: resources of the TXOP are allocated to Group Owner station STA$_{DL1}$ of a P2P group. DiL transmissions between it and other station STA$_{DL2}$ of the group may then take place. DiL transmissions comprises PHY preambles 560, 580 and related DiL data 570, 590.

The Figure clearly shows that the transmissions (MU or P2P) in the shared frequency bands (RU5 corresponding to the secondary channel and RU6 corresponding to the tertiary channel) go on independently to the transmissions made by the coordinator BSS (here in the primary channel).

Due to the presence of an independent oscillator in each wireless device and due to different propagation delays between each transmitting device and receiving device (in coordinator, coordinated BSSs and P2P groups), the successive communications within the various 20 MHz channels suffer from multiple Carrier Frequency Offsets and multiple Time Offsets. Severe misalignments of the transmissions arise, resulting in both Inter-Symbol Interference (PHY cyclic prefix is corrupted) and loss of orthogonality over the 20 MHz channels. The larger the TXOP, the more important the co-channel interferences, which at the end may result in losing the whole communications.

Line 599 shows such misalignment of the PHY preambles (245, 540, 580) with respect to the end of the UL Length 332 signalled in the TF 210, resulting from the independence of the 20 MHz channels in the multi-AP sharing scheme: the preamble 540 (to DL data 550) sent by the coordinated AP (in BSS2) over the 20 MHz channel is not superposed in time with preamble 245 (simultaneously) sent by the AP of BSS1 in the primary 20 MHz channel. Similarly, the PHY preamble 580 for the DiL communication sent by a DiL station over the tertiary channel is not superposed in time neither with preamble 245 of the primary channel nor with preamble 540 of the secondary channel.

Compensating TO and CFO between all the groups of wireless devices is not realistic.

Consequently, new schemes should be designed to obtain a better alignment of the PHY preambles across the 20 MHz channels (i.e. exactly the same preamble that is simultaneously_within a 1 µs margin_emitted by the wireless devices).

The present invention addresses such issue of interferences that occur between adjacent 20 MHz channels (co-channel interference) as the emitting devices are not well synchronized. This issue is particularly relevant in multi-AP context because different coordinator/coordinated APs emit their signals in different channels. While all those communications occur in parallel 20 MHz channels, it becomes useful to align the start of PHY preambles and the durations of communications in order to limit co-channel interferences.

An enhanced multi-AP scheme overcoming this concern is proposed that helps the various devices (P2P devices and stations of coordinated BSSs) to remain sufficiently synchronized to reduce co-channel interferences.

The coordinator AP previously sends a resource sharing frame (TF 210) to be granted a transmission opportunity, TXOP. The resource sharing frame allocates, for an allocation duration (usually less than or equal to the duration of the TXOP), a shared frequency band (20 MHz channel or channels) of the granted TXOP to a coordinated group (BSS2 or a P2P group for instance).

The enhanced scheme provides that a common entity, preferably the coordinator AP, sends, at a predefined sync time within the allocation duration (i.e. after a predefined sync duration less than the allocation duration), a synchronization frame over the allocated shared frequency band. It means that the coordinator AP voluntary interferes on a shared channel on which it should not communicate during the allocation duration.

However, as the sync time is predefined, the other devices know in advance that the coordinator AP will send such synchronization time. The voluntary interference is consequently not prejudicial to the communication performed by the coordinated group in the shared resource.

The non-coordinator stations thus receive the resource sharing frame and, in response, start exchanging data over the allocated shared frequency band, during the allocation duration. With the present invention, they receive the synchronization frame initiated by the coordinator AP at the predefined sync duration.

Consequently, the non-coordinator stations can stop exchanging data for the reception of the synchronization frame (in practice the coordinated device may organize the communications within the coordinated group to let the shared resource idle for the sync time).

The same stations may start again exchanging data over their shared frequency bands just after the synchronization frame, i.e. at a time controlled by the coordinator AP. It results that the wireless devices of the various coordinated groups are substantially synchronized with the coordinator group. Co-channel interferences are reduced.

While the above explanations focuses on coordinator and coordinated APs, the present invention is directed to any kind of devices operating as coordinator and coordinated entities.

Any device, and not only APs, can obtain a TXOP and decide to share it using the proposed mechanism. Therefore, coordinator devices may be different from APs.

In other words, in addition to the coordinated BSS, it may be considered other groups of communications, like group of stations that communicate in Direct Link (introduced above with reference to FIG. 2). Within such short range and dynamic network configuration, one station device may be elected as the Group Owner and acts as a central hub for all P2P communications. As a result, the Multi-AP (sharing) scheme may be applied to the Direct Link, wherein the device elected as group owner for a given P2P group may have an equivalent role as the coordinated AP evocated above for a given BSS.

Consequently, in the following description, it is made reference to a "coordinator device" for the entity that triggers the multi-AP-based coordinated scheme and offers shared resources to other groups or BSSs (for instance a coordinator AP or a coordinator P2P station). Correspondingly, it is made reference to a "coordinated device" for any entity that manages such other group or other BSS: for instance it may correspond to either a coordinated AP in the context of another BSS or a Group Owner station in the context of a P2P group.

Figures 6A, 6B:
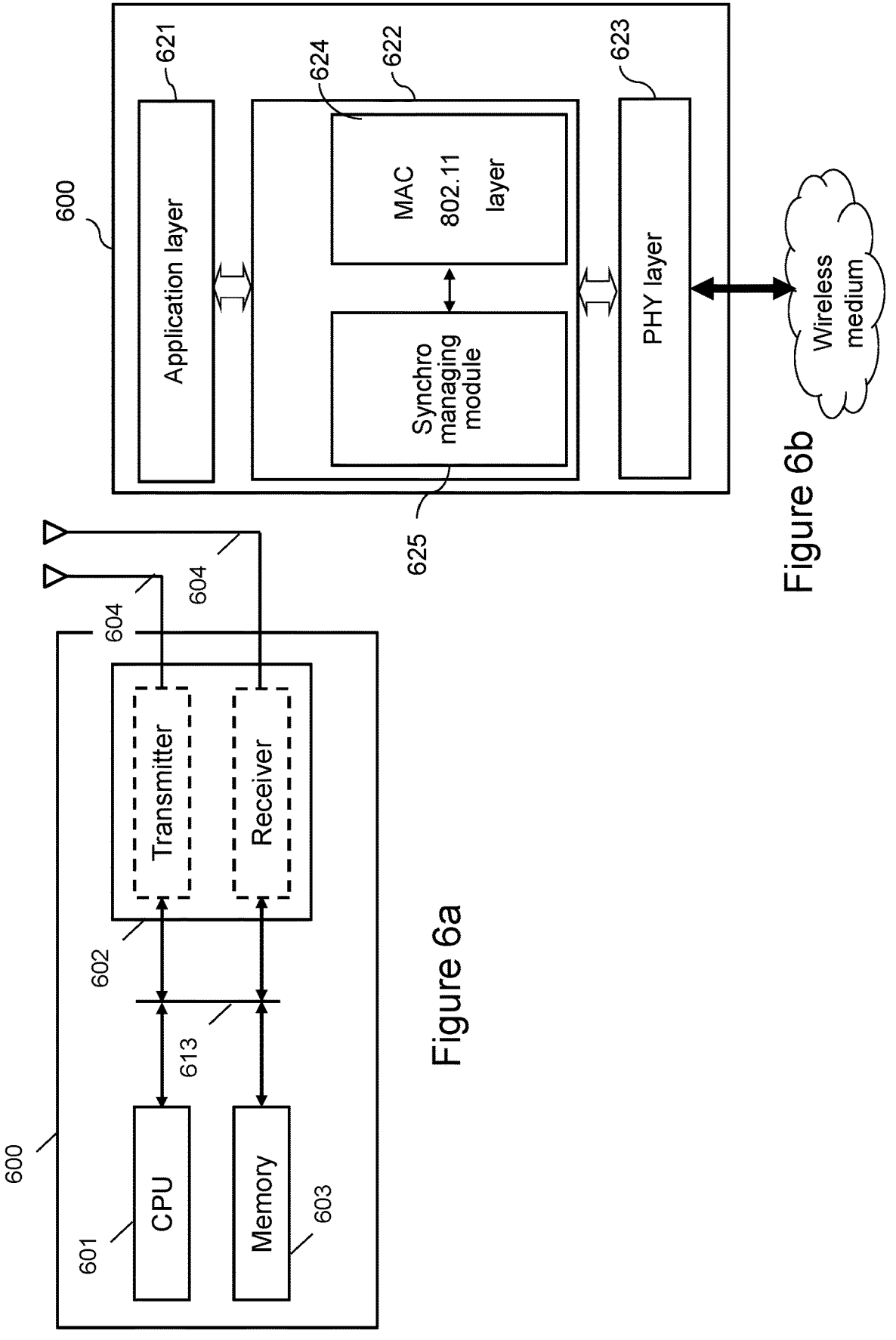
FIG. 6a shows a schematic representation a communication device in accordance with embodiments of the present invention.
FIG. 6b shows a schematic representation of a wireless communication device in accordance with embodiments of the present invention.

FIG. 6a schematically illustrates a communication device 600 configured to implement at least one embodiment of the present invention, for instance any of the (AP and non-AP) stations shown in FIG. 1. The communication device 600 is either a coordinator device, a coordinated device or a mere station managed by the coordinator or coordinated device.

The communication device 600 may preferably be a device such as a micro-computer, a workstation or a light portable device. The communication device 600 comprises a communication bus 613 to which there are preferably connected:

a central processing unit 601, such as a processor, denoted CPU;

a memory 603 for storing an executable code of methods or steps of the methods according to embodiments of the invention as well as the registers adapted to record variables and parameters necessary for implementing the methods; and at least one communication interface 602 connected to a wireless communication network, for example a communication network according to one of the IEEE 802.11 family of standards, via transmitting and receiving antennas 604.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The executable code may be stored in a memory that may either be read only, a hard disk or on a removable digital medium such as for example a disk. According to an optional variant, the executable code of the programs can be received by means of the communication network, via the interface 602, in order to be stored in the memory of the communication device 600 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 6b is a block diagram schematically illustrating the architecture of the communication device 600, adapted to carry out, at least partially, the invention. As illustrated, device 600 comprises a physical (PHY) layer block 623, a MAC layer block 622, and an application layer block 621.

The PHY layer block 623 (here an 802.11 standardized PHY layer) has the task of formatting, modulating on or demodulating from any 20 MHz channel or the common communication channel, and thus sending or receiving frames over the wireless radio medium used, such as 802.11 frames, for instance medium access trigger frames TF to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 622 preferably comprises a MAC 802.11 layer 624 implementing conventional 802.11ax MAC operations, and additional block 625 for carrying out, at least partially, the invention. The MAC layer block 622 may optionally be implemented in software, which software is loaded into RAM 603 and executed by CPU 601.

Preferably, the additional block 625, referred to as synchro managing module which has different operations to implement parts of the invention, depending on the role played by the communication device 600. As the same device can play different roles over time, the additional block 625 is preferably designed to selectively perform the different operations.

For instance, and not exhaustively, the operations for the communication device acting as a coordinator device may include selecting coordinated devices (AP or non-AP P2P stations), generating the initial trigger frame announcing the resource sharing and comprising for instance indications of the RU allocations for the stations of the same group and for other groups, and indications that a synchronization process runs; generating and sending synchronization frames at appropriate sync times.

For instance, and not exhaustively, the operations for the communication device not acting as a coordinator device may include receiving the announcing (trigger) frame from the coordinator device; determining that a synchronization process runs in order to be in waiting mode at the sync times; receiving the synchronization frame; exchanging data within its own BSS or P2P group taking into account the synchronization process.

MAC 802.11 layer 624 and synchro managing module 625 interact one with the other in order to process accurately communications over OFDMA RUs addressed to multiple stations according to embodiments of the invention.

On top of the Figure, application layer block 621 runs an application that generates and receives data packets, for example data packets such as a video stream. Application layer block 621 represents all the stack layers above MAC layer according to ISO standardization.

Embodiments of the invention in its different aspects advantageously considers emitting by one or more coordinated devices a control frame that replicates the information of an initial trigger frame (so-called "announcement frame", emitted by a coordinator device) before issuing their HE PPDUs in the obtained shared RUs, in order that all stations in the vicinities of the coordinated devices (in particular the stations out of coordinator's transmission range) can received such information before the usage of the shared RUs starts. As the initial trigger frame signals a multi-AP-based resource sharing, all the stations receiving it or a copy thereof become aware of such sharing and consequently can switch their primary channel when necessary. As the resource allocation information forming a large part of the initial TF received by the coordinated devices is replicated as it is into a new control frame (so-called "re-announcing frame"), a correct, fast and easy duplication per 20 Mhz channel can be achieved by the coordinated devices in a synchronous manner.

Figure 7:
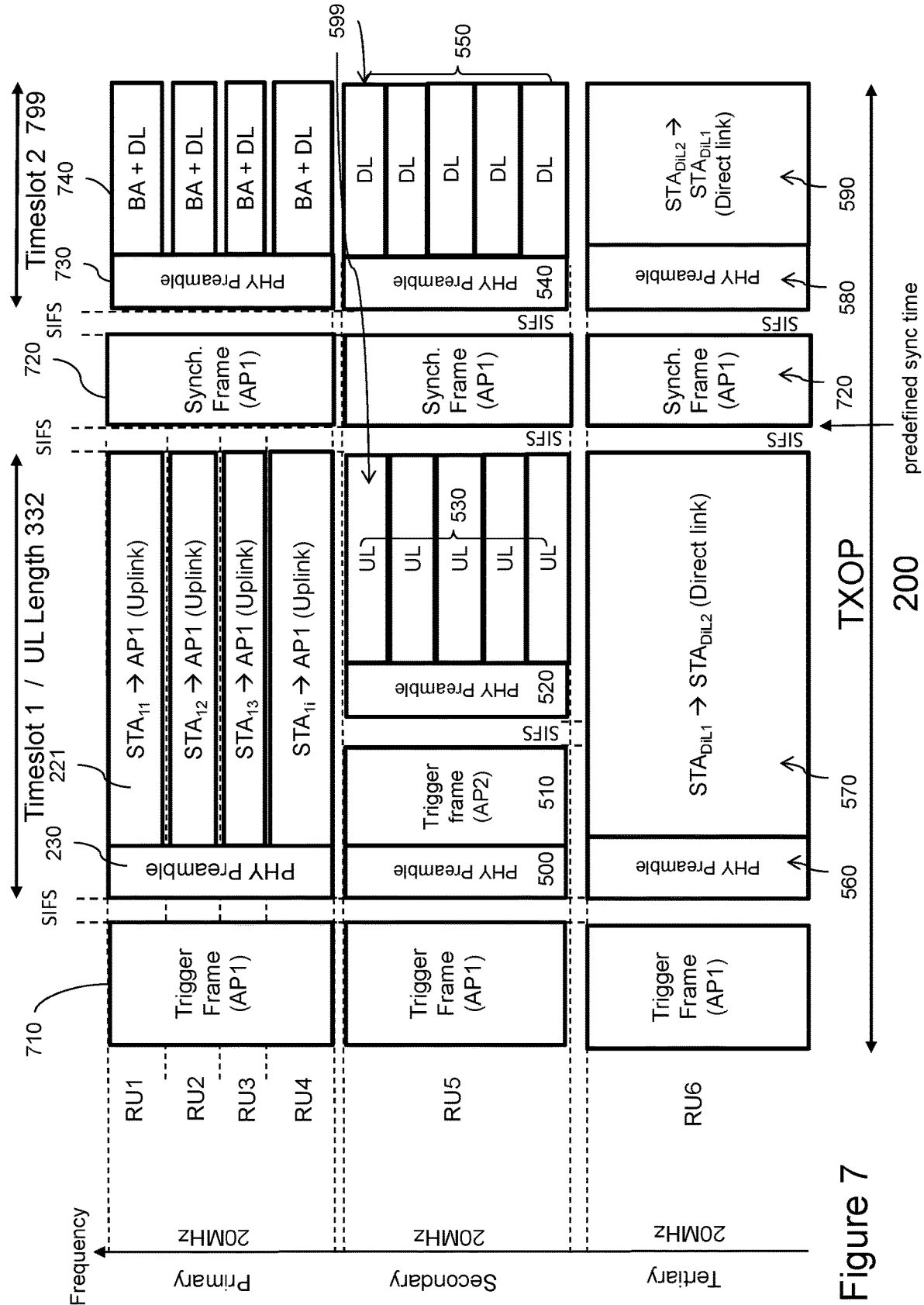
FIG. 7 illustrates another multi-AP-based transmission sequence implementing embodiments of the invention.
Figures 8, 9:
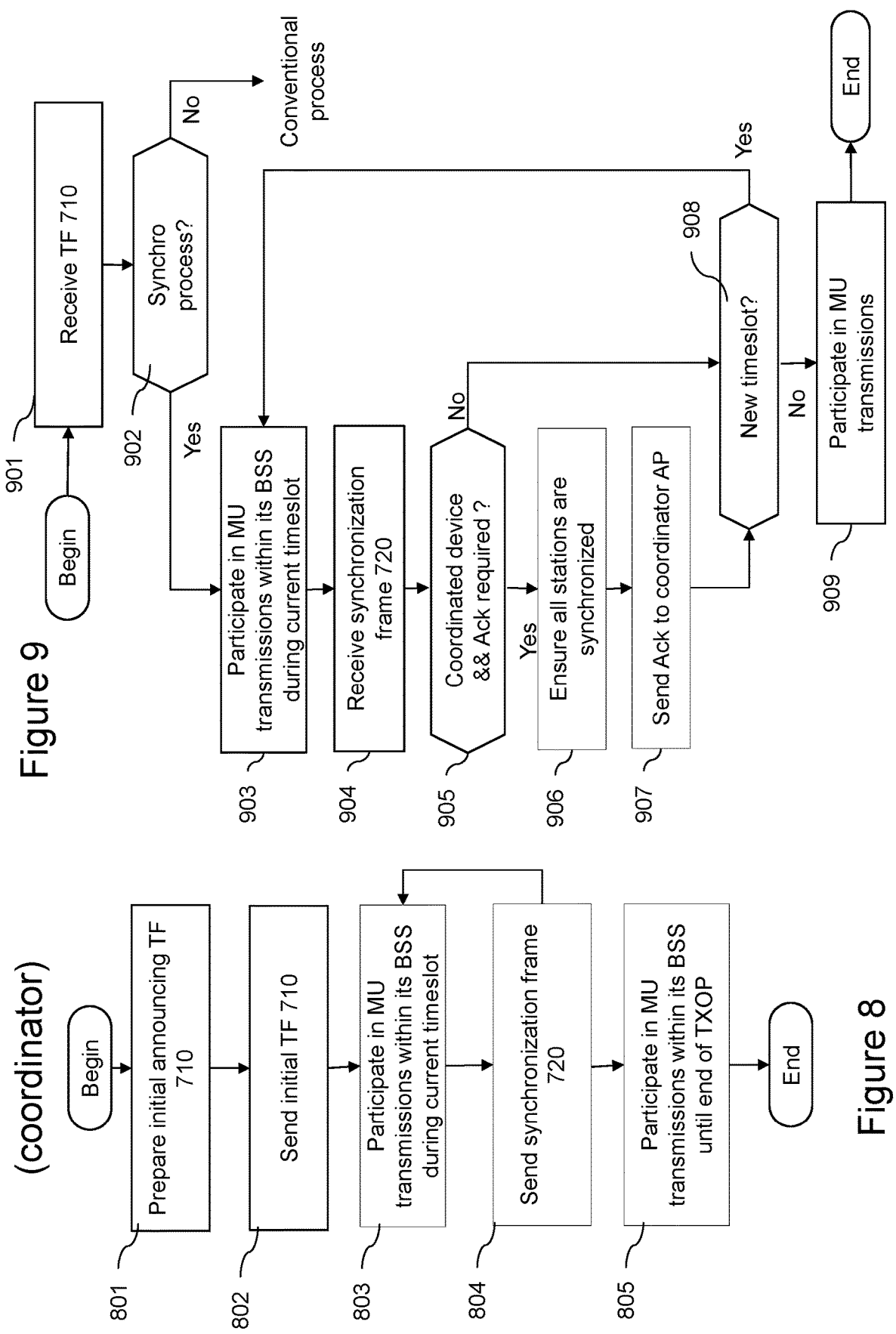
FIG. 8 illustrates, using a flowchart, general steps at a coordinator device according to embodiments of the invention.
FIG. 9 illustrates, using a flowchart, general steps at a non-coordinator device according to embodiments of the invention.

The idea of the invention is illustrated in FIG. 7 which shows a similar transmission sequence to FIG. 5, with an implementation of the invention. FIG. 8 is a flowchart illustrating general steps of a communication device acting as a coordinator device, in particular during the sequence of FIG. 7, according to embodiments of the invention. FIG. 9 is another flowchart illustrating general steps of a non-coordinator communication device (i.e. acting as a coordinated device or as a mere station), in particular during the sequence of FIG. 7, according to embodiments of the invention.

As readily apparent from FIG. 7, an initial trigger frame 710 is still emitted over communication channels to announce the resource sharing based on multi-AP technology. This announcing frame is conceptually equivalent to TF 210 described above, but may optionally comprise an additional indication as further described below in order to signal when a synchronization process runs.

Where the allocated shared frequency band requires it, the stations perform a primary channel switch to the appropriate channel (indicated in the TF 710 or locally known trough predefined rules).

The MU transmissions 221, 510+530 and DiL transmission 570 start a SIFS after the TF 710 (including their preambles 230, 500+520 and 560). Such transmissions last a timeslot defined by the TF 210 (the "UL Length" subfield 332). Exemplary transmissions have been described previously with reference to FIG. 5.

In embodiments seeking to reduce interference between adjacent 20 MHz channels, while the preambles 500, 520 are emitted over the whole 20 MHz band, the related data 520, 540 are transmitted over a narrower band. For example, an empty 26-tone RU may be defined (e.g. using AID=2046 in the corresponding User Info field 340) at one (or both) bounds of the 20 MHz channel (made of 242 tones). An empty RU is shown under reference 599 in the Figure, which is the closest RU to the primary channel of AP1.

As mentioned above, the TF 710 allocates resources, e.g. one or more RUs (here RU5 defining the shared frequency band), to BSS2 by setting for instance AP2's BSSID in the corresponding "AID12" subfield 341. Similarly, RU6 is allocated to the P2P group using for instance the P2P session identifier in the corresponding "AID12" subfield 341.

At the end of the timeslot (UL Length 332), coordinator AP1 emits a synchronization frame 720 over the various 20 MHz channels. This is to resynchronize all the triggered stations (those of BSS2 and of the P2P group). Indeed, the next MU transmissions 740 (in the primary channel for coordinator BSS1), 550 (in the secondary channel for coordinated BBS2), 590 (in the tertiary channel for coordinated P2P group) can start again a SIFS after the synchronization frame 720. Consequently, their PHY preambles 730, 540, 580 are perfectly aligned as shown in the Figure.

As the synchronization frame 720 takes place within a 802.11ax process and will not be used by legacy stations (to set their NAV), it can be sent in a high modulation (MCS) in order to reduce the overhead impact.

The synchronization process may be systematic for the coordinator device in which case there is no need to signal the running of the process. When the coordinator device has the option to activate or deactivate the process (i.e. to send or not the synchronization frame 720), it may signal it in the TF 710. In that case, the resource sharing frame (TF 710) includes a sync field indicating that a synchronization frame is expected at the predefined sync time.

The wireless devices of the coordinated groups therefore read the sync field to know whether it has or not to consider that each transmission timeslot (announced in the "UL Length" field 332) is separated by a new synchronization control frame with the aim of synchronizing the co-channel activities. In case of synchronization process, the granted time (UL Length) for shared communications is reserved for a single way communication and no response shall be emitted a SIFS later. Instead, the devices have to wait for the synchronization frame 720.

In some embodiments, the sync field field is implemented in the Trigger Type subfield 331 of frame 710. Subfield 331 may be set to a value indicating the synchronization process runs. For instance one or more reserved values ('8', '9', and so on) can be used.

In a variant, a specific subfield (e.g. a single bit acting as the sync field) can be used as a signalling element of the synchronization process.

In one implementation, bit 39 (reference 343 in FIG. 3) of the 802.11ax User Info field 340 is used to this purpose. Alternatively, one or more bits in the Trigger Dependent User Info subfield 344 can be used. Advantageously, such bit or bits at RU level makes it possible for the coordinator AP to selectively choose for which coordinated group it will send the synchronization frame 720. This is particularly adapted to the case where only some coordinated groups suffer from desynchronization or may cause co-channel interferences (not the case for isolated 20 MHz channels for instance and for groups always synchronized with the coordinator group). The use of subfields at RU level is backward-compatible with the existing 802.11ax TF format.

In another implementation, a bit within the Common Info subfield 330 can be used. Such signalling is thus common to all the coordinated devices. It is preferably applied when a synchronization is required for all the devices because all devices (of all BSSs and P2P groups) have a common interest of avoiding co-channel interferences.

As an example, "CS Required" bit (reference 336 in FIG. 3) can be used, as it is meaningless at that time in the case of trigger frames for multi-AP technology. In a variant, reserved bit B63 (reference 334) can be used or any bit or multiple-bit field in the Trigger Dependent Common Info field 335 can be used. Such signalling at the Common Info field 720 level is also backward-compatible with the existing 802.11 ax TF format.

In the exemplary scenario of the Figure, the synchronization frame 720 is simultaneously sent over all frequency bands being reserved for the granted TXOP, i.e. the primary, secondary and tertiary 20 MHz channels indicated in the TF 710.

Other approaches may be contemplated.

It is estimated that risks of loss of synchronization is increased in case of primary channel switch. This is because of the delay for stations to switch their primary channel of operation to operate on a distinct 20 MHz channel. To specifically focus on this source of desynchronization, the synchronization frame may be simultaneously sent over the shared frequency bands allocated, in the resource sharing frame, to coordinated groups that have to switch their primary channel to use their allocated shared frequency bands. In that case the other channels do not experience an overhead for the synchronization frame.

As the stations in the coordinator BSS remain inherently synchronized with the coordinator AP, one may contemplate sending the synchronization frame over each shared frequency band allocated, in the resource sharing frame, to a (coordinated) group separate from the coordinator group. That is to say the synchronization frame may not be sent over the 20 MHz channels kept for the coordinator BSS.

The coordinator AP may also be aware that some groups do not suffer from desynchronization. This may for example be the case for the non-transmitted BSS managed by the same physical AP as the coordinator AP. In such a situation, the coordinator AP may wish to perform synchronization with a subset of the groups only. The synchronization frame is therefore send over a selected subset of the frequency bands defined in the resource sharing frame.

The co-channel interferences exist when 20 MHz channels are adjacent or overlapping. In this contest, it may additionally be decided that no synchronization channel is sent over the isolated channels in case of punctured communication channel. Consequently, the synchronization frame is simultaneously sent only over frequency bands being reserved for the granted TXOP that are adjacent.

The resynchronization of the wireless devices to the coordinator AP makes it possible to have a large transmission in the timeslot 799 following the synchronization frame 720. Now, each of the two timeslots 332 and 799 has individually the same synchronization constraint (and therefore possible duration) as the similar timeslots (332 and the one for 245 and 241) had together in the known technics. Consequently, the allocation duration (possibly the time length of the TXOP 200) may be made very long. In particular the length may be further increased if the wireless devices are regularly resynchronized with successive synchronization frames over the TXOP.

In this respect, a subsequent synchronization frame may be sent over the allocated shared frequency band (secondary and tertiary channels), at a subsequent predefined sync time within the allocation duration. The second timeslot is thus defined between the predefined sync time and the subsequent sync time. A third and last timeslot 799 is thus defined from the subsequent sync time up to the end of TXOP (unless another synchronization is frame to have another timeslot). The subsequent predefined sync time can be defined in the preceding sent synchronization frame, for instance through the UL Length field 332. The value of the UL Length field 332 in the synchronization frames 720 may be the same or not, and be the same as the one in the initial TF 710 or not.

Recursively, several timeslots can be successively signaled in successive synchronization frames sent by the coordinator AP (in which case the timeslot durations may be defined in the synchronization frames, thereby defining the successive predefined sync times). Transmissions within the coordinated group can start again a SIFS after each synchronization frame, until the next predefined sync time.

The increased time length of timeslot 799 (compared to the time available for BA frame 241 transmission in FIG. 5) makes it possible to exchange DL MU PPDU 740 which may comprise, in addition to BA information (as in FIG. 5), other DL data frames to occupy the entire timeslot 799. This situation is highly beneficial for two-direction flows (like TCP protocol) where data from opposite direction has to be conveyed quickly and requires also some bandwidth to be conveyed (e.g. TCP Acks usually go with TCP data segments).

The duration of the second timeslot 799 in the Figure can be easily obtained by comparing the TXOP Length (subfield 312 of TF 710) against the UL Length (subfield 332 of TF 710).

Alternatively, the duration of the next timeslot could be specified by coordinator AP1 in the synchronization frame 720. This is the case for instance when several timeslots are provided between sent synchronization frames.

Generally, the duration of the timeslots specified in the UL Length fields 332 are dimensioned such that the drift (as perceived from past operations, i.e. history monitored by the coordinator AP) remains less than a SIFS (such that synchronization frame is not corrupted by transmission ends of the coordinated groups over their allocated shared frequency bands).

Basically, any frame format (data, control, management frame formats) can be used for the synchronization frame

720, provided that it is emitted by the coordinator device (AP1) which is the current TXOP owner.

As example, a dedicated frame or a QoS_Null frame can be used.

Preferably, a trigger frame format is used as this frame relates to the multi-AP coordinating scheme (triggered with trigger frames). The frame may not contain any User Info field since the first goal of the frame is not to define resources and allocation thereof (therefore the shared RU allocation as provided by TF 710 remains the same). A replication of the TF 710, optionally with the TA field 314 emptied or missing, can also be used to facilitate the creation of the frame.

To facilitate the identification of the synchronization frame 720 by the stations of the coordinated groups (not to confuse with a mere Trigger frame, because the next MU or P2P transmissions start a SIFS after the synchronization frame 720), a new Trigger Type (i.e. one of the reserved values 8 to 15) is specified in the Trigger Type subfield 331 of the Common Info field 330. The synchronization frame 720 thus has a conventional MAC header 310, the Trigger Type 331, the UL Length field 332 (if needed to declare a next timeslot) and any other signaling field discussed below. The other fields shown in FIG. 3 are not mandatory. The stations thus only have to read this subfield 331 to clearly distinguish TF 720 from any other trigger frame, and therefore to prepare to transmit a SIFS after.

Alternatively to defining a new Trigger Type, the synchronization frame 720 may be signaled in the Frame Control field 311 of the MAC header 310. In that case, the MAC payload may be reduced to merely comprise the UL Length field (if needed to declare a next timeslot) and any other signaling field discussed below. The other fields shown in FIG. 3 are still not mandatory.

A trigger frame format is preferably used when successive timeslots are provided. This is because it already includes fields to trigger a new transmission and to define the timeslot length (UL Length 332). In that case, the TF synchronization frame 720 indicates a lower duration timer (Duration field 312) than TF 710, to reserve the same TXOP airtime as TF 710. The Duration field 312 of TF 710 encompasses the time length of the synchronization frame 720, plus one SIFS per synchronization frame and the UL Length fields 332 of the synchronization frames 720.

In some embodiments, the coordinator AP may wish to receive an acknowledgment from the coordinated devices. This aims at covering the situation where some stations of the coordinated groups are too far away from the coordinator AP to correctly receive the synchronization frame from it. A synchronization process within the coordinated group must then take place, at the end of which the coordinated device may send the acknowledgment to the coordinator AP.

The coordinated devices may systematically send an acknowledgment frame to the coordinator device in response to the received synchronization frame 720. However, a signaling may be provided in the synchronization frame 720, for the coordinator AP to activate or not the acknowledgment requirement, depending on the context.

Any bit or field within the synchronization frame 720 can be used to this end. In the case of a synchronization trigger frame, the acknowledgment signaling field may be the "CS required" field 336.

According to embodiments where the trigger frame format of the synchronization frame 720 specifies a MCS subfield 345, the MCS of the synchronization frame 720 can be different compared to the initial TF 710, in particular a greater MCS to occupy less time on the wireless medium.

Turning now to FIGS. 8 and 9, the operations at the various devices according to embodiments of the invention are explained.

It is assumed that all the devices (in particular the APs and the P2P group owners) have an AP Candidate Set listing the other BSSs or P2P groups wishing to be provided (through multi-AP sharing) new resources for data transmission. Based on such Set and on the resource requests coming from other APs and other P2P group owners, a coordinator device accessing the medium may decide to share resources.

With reference to FIG. 8, at step 801, the coordinator device, let say a coordinator AP, prepares the trigger frame 710 for triggering a multi-user (MU) transmission for the coordinated scheme. The TF 710 allocates some resource units to the non-AP stations of its BSS and allocates one or more resource units to other BSSs and/or P2P groups using appropriate indication (e.g. BSSID or DiL session identifier or MAC address in the corresponding AID12 subfields 341).

During the same step 801, the coordinator AP also determines to activate or not the synchronization process, if it is not systematic. The synchronization process may be activated for some or all the 20 MHz channels reserved for the TXOP as discussed above (all, only switching group, all shared channels, selected subset, etc.).

As mentioned above, the coordinator AP's decision may be included in a dedicated sync field as discussed above, for instance the Trigger Type subfield 331, the B39 bit 343, one or more bits in the Trigger Dependent User Info subfield 344, one or more bits within the Common Info subfield 330 such as the "CS Required" bit 336 or bit B63 334 or even one or more bits in the Trigger Dependent Common Info field 335.

The selection of the RUs to allocate (share) to a coordinated device may be made by the coordinator device in consideration of whether the coordinated device has to switch its primary channel. Preferably, the coordinator device seeks to reduce the number of coordinated devices (and thus of associated stations) having to switch their primary channels.

The coordinator device may be aware of the primary channels used by individual stations (e.g. it may appear that a direct link session can take place outside the BSS of the coordinator AP, such that the primary channel of direct link stations is not the same as the primary channel of the coordinator AP) and/or by coordinated BSSs (e.g. it may appear that coordinator BSS and coordinated BSS(s) have not the same primary channel). In any case, the primary channel of the coordinated devices is encompassed into the channel bandwidth operated by the coordinator AP (otherwise they will not receive the initial announcing TF 710). As an example, a BQR trigger frame (standing for Bandwidth Query Report) may be used by the coordinator AP to trigger the most appropriate channels for each of the coordinated devices/BSSs/P2P groups.

The initial announcing TF 710 so prepared is sent as described above at step 802, by the PHY of the coordinator AP, to trigger various stations (some non-AP stations of its own BSS, but also coordinated devices such as other APs of distinct BSSs and/or P2P Group Owner stations). It is sent over each 20 MHz channel forming the common communication channel detected as free.

Next, at step 803, the coordinator AP participate to the MU communication (230, 221) during the UL Length duration, over the resource units kept for its BSS. The MU communication starts a SIFS after the sent control frame. If the RUs are uplink RUs, the coordinator AP receives data frames from non-AP STAs of its BSS.

Note that other transmissions are performed in parallel that do not involve the coordinator AP. For each DiL RU, the destination non-AP STA (of direct link communication) receives data frames from the P2P group Owner over this RU. For each shared RU allocated to a distinct BSS, a MU transmission within the distinct BSS takes place (between non-AP STAs of this distinct BSS and the coordinated AP of the same BSS).

In embodiments, the coordinator AP does not participate to the MU communication (that is to say it shares all granted channels for operation outside of its BSS) but waits for current timeslot expiration (i.e. UL Length duration).

At the end of the UL Length duration (defining the predefined sync time), the coordinator AP sends the synchronization frame 720 over the 20 MHz channels it has selected for synchronization at step 801. This is step 804.

As noted above, the synchronization frame 720 may announce a subsequent transmission timeslot (by signaling a new UL Length for instance), in which case the coordinator AP loops back to step 803 and starts the new MU communication a SIFS after the synchronization frame 720. Otherwise, it participates to the last MU communication (730, 740) up to the end of the TXOP.

At any time, the coordinator AP may stop the TXOP (for instance by emitting a CF-End frame with a Duration field set to 0).

With reference to FIG. 9, any non-coordinator device in the transmission range of the coordinator AP and whose primary channel conveys one of the duplicates of the initial TF 710, receives the initial TF 710 at step 901. The non-coordinator device can be a non-AP STA of any BSS, an AP of a BSS, or a STA within a P2P group.

Note that conventional trigger frames are processed in a conventional manner (802.11ax for instance) not shown in the flowchart.

The device may read (step 902) the sync field in the received frame 710 to determine whether a synchronization process is running (if the synchronization process is not systematic for the group to which the device belongs). If no synchronization process runs, the wireless device operates in a conventional manner (e.g. as in FIG. 5).

If the synchronization process is running, the non-coordinator device participates (step 903) to the MU or P2P communication (230, 221; 500, 510, 520, 530; 560, 570) during the UL Length duration, over the resource units allocated to its group. The MU or P2P communication starts a SIFS after the sent control frame. This participation may require a primary channel switch as explained previously.

At substantially the end of the UL Length duration (defining the predefined sync time), the device enters a waiting state and receives the synchronization frame 720. It uses it to realign its inter-frame-space (IFS) duration. This is step 904.

Depending on the drift of the device relatively to the coordinator AP, the synchronization frame 720 can be received sooner than expected (before the expiration of a SIFS period after the UL length) or later. If it is received after 2×SIFS, it determines that an error occurred (the local oscillator is faster than the one of the sharing AP).

If the device is a coordinated device (i.e. coordinated AP or P2P group owner), it may determine from the received synchronization frame 720 whether an acknowledgment is required (test 905).

In the affirmative, it ensures that all the stations of its coordinated group become synchronized (step 906—they all realign their inter-frame-space (IFS) duration) before it sends the acknowledgment to the coordinator AP (step 907—the acknowledgment is not shown in the timeline of FIG. 7)

In the negative or after step 907, the device determines (step 908) whether the synchronization frame 720 announces a subsequent transmission timeslot (by signaling a new UL Length for instance), in which case the device loops back to step 903 and starts the new MU or P2P communication a SIFS after the synchronization frame 720. Otherwise, it participates to the last MU or P2P communication (730, 740; 550; 580, 590) up to the end of the TXOP (step 909).

At the end of the TXOP 200, the devices that have switched their primary channel, switch back to their original primary channel.

The present invention thus makes it possible to keep the shared frequency bands synchronized with the coordinator BSS, in order to avoid or at least reduce the co-channel interferences.

Although the description above is based on frequency division, the proposed synchronization mechanism can apply with a timing division sharing (that is to say the various coordinated devices obtain each a timeslot for their BSS successively, and communications operates on a single-user mode).

Some stations of the coordinated groups (i.e. having a shared frequency band allocated to them by the TF 710) may be out of the transmission range of the coordinator AP. Consequently, they cannot receive both the initial TF 710 and the synchronization frame 720.

To overcome this deficiency, it is proposed that the coordinated device (i.e. the AP or group owner of the coordinated group) helps the out-of-range stations to receive these frames or an equivalent frame acting for reservation and re-synchronization purposes. This is step 906 (for the synchronization issue).

In this respect, it is proposed that the coordinated device repeats the content of the initial TF 710 and synchronization frame or frames 720, upon reception. This adds some delays (the MU or P2P transmissions must start a SIFS after the repeating frames) but allows the whole coordinated group to be securely synchronized. The process of FIG. 9 still operates where the reception of the repeating frames correspond to steps 901 and 904.

Preferably, the frame repeating the initial TF 710 may be a copy of the initial TF with the TA field 314 (in the MAC header 310) emptied or missing. Optionally a specific Trigger Type may be indicated in the Trigger Type subfield 331.

Similarly, the frame repeating a synchronization frame 720 may be a mere copy of the synchronization frame 720 with an indicator set to "repeating frame" in order for the out-of-range stations to be able to start a new MU or P2P transmission only a SIFS after this frame. In some embodiments, at substantially the end of the UL Length duration (defining the predefined sync time)+2*SIFS+the "repeating frame" duration, the out-of-range device receives, from its coordinated device, the Ack frame repeating the synchronization frame 720. It uses it to realign its inter-frame-space (IFS) duration.

Figure 10:
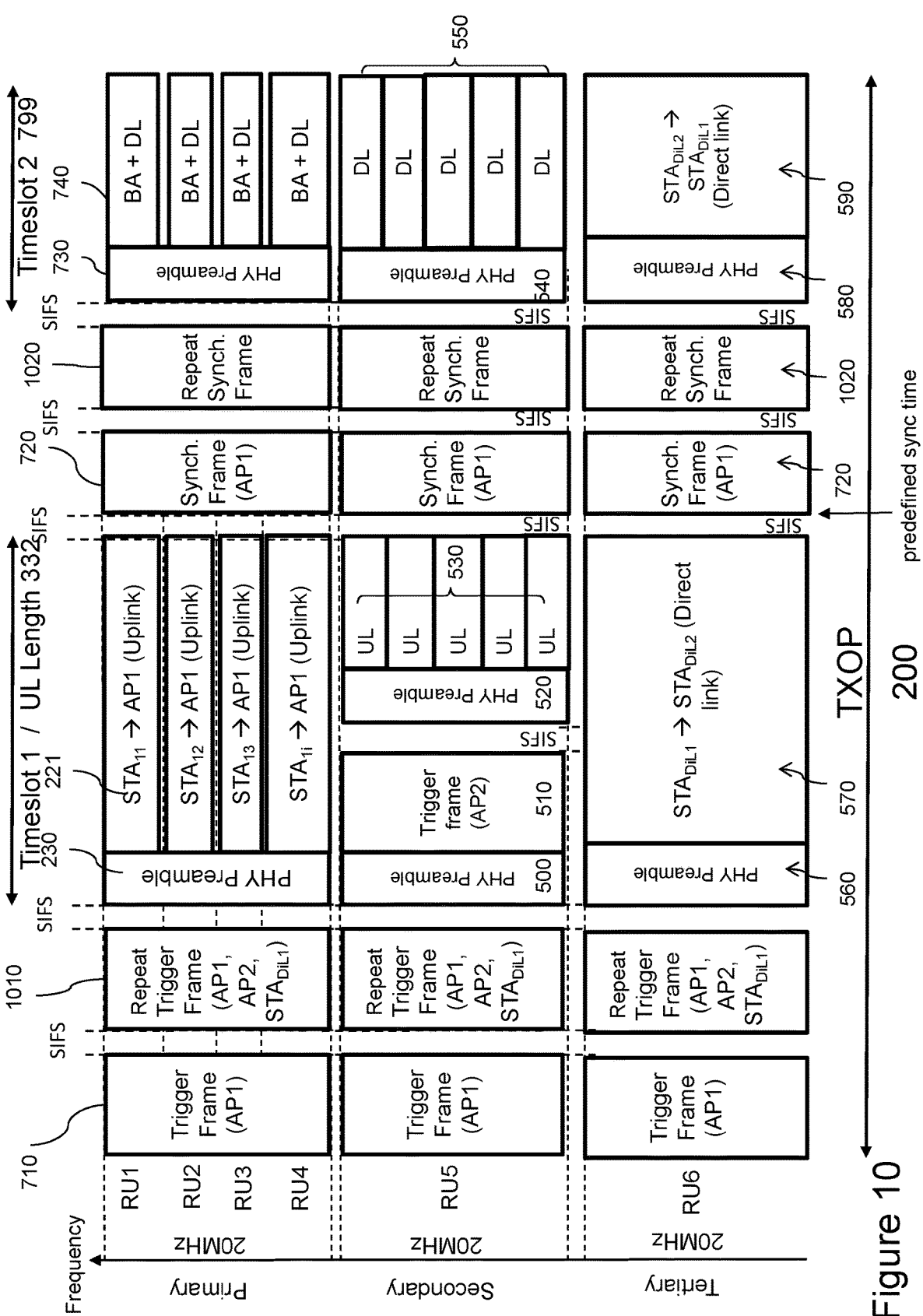
FIG. 10 illustrates an alternative multi-AP-based transmission sequence implementing embodiments of the invention.

FIG. 10 illustrates this situation with the same scenario as FIG. 7.

In the shown timeline, all the APs and group owners involved in the TXOP (including coordinator AP1) repeat the initial TF 710 with frame 1010 and the synchronization frame 720 with frame 1020.

Figure 11:
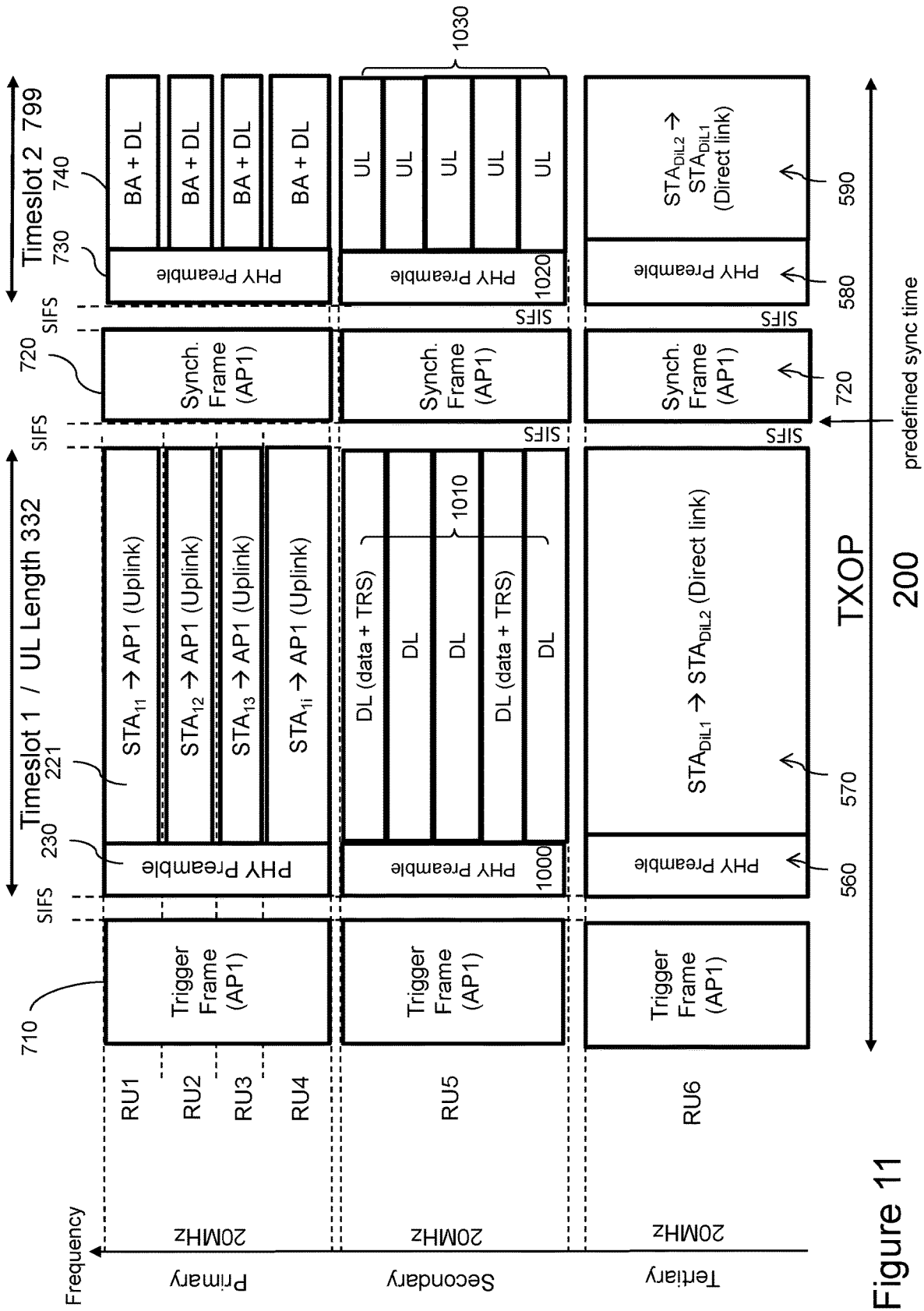
FIG. 11 illustrates another alternative multi-AP-based transmission sequence implementing embodiments of the invention.

FIG. 11 illustrates another transmission sequence according to embodiments of the invention, which may be combined with the repeating frames illustrated in FIG. 10.

This sequence aims at avoiding the misalignment of having a PHY preamble 520 on a shared frequency band during a timeslot 332 (see line 598 in FIG. 5), while MU or P2P data transmissions are running on adjacent channels.

It is proposed here to avoid the individual trigger frame 510 that is short in time and thus requires that, during the timeslot, another PHY preamble 520 be emitted for the triggered UL transmission 530.

In this scenario, the transmission sequence within BSS2 is modified compared to FIG. 7: to avoid having preamble 500 and related data 510, coordinated AP2 starts communicating in the shared RU with a DL transmission (DL MU PPDU—preamble 1000 and data RU 1010) that lasts during the entire UL Length 332 defined in TF 710. In other words, the coordinated device starts a multi-user downlink transmission over allocated shared resources with non-AP stations of its own basic service set.

The synchronization frame 720 is emitted a SIFS after the end of the first timeslot.

An UL communication (UL PPDU—preamble 1020 and UL data 1030) can take place a SIFS after the synchronization frame 720 (or its acknowledgment or its repeating frame). This aims at aligning the communications between the groups (here BSS1 and BSS2), in particular aligning the preambles. It results that the channel interferences are reduced.

In order that the UL transmission correctly occurs without a trigger frame being emitted, the DL MU PPDU (1000, 1010) is used to trigger the Uplink RUs. In other words, the multi-user downlink transmission includes an indication of a subsequent multi-user uplink transmission opportunity over the allocated shared resources.

For instance, some of the DL data frames contain a TRS Control subfield (according to 802.11 ax, TRS Control subfield in the MAC header is used to initiate OFDMA transmissions in the uplink direction and identifies non-AP STAs participating in the UL MU transmissions and assigns RUs to these STAs). The resulting UL RUs 1030 provide room for triggered (via TRS) non-AP stations of BSS2 to emit UL data and/or acknowledgments with regards to the received DL data 1010.

Usually, the TRS subfield within the MAC header of a data frame is used to trigger a response (UL transmission) from the same non-AP station that receives the DL data frame. This means that the same non-AP STAs are addressed in DL and in UL.

In order to bypass that limitation, the coordinated AP2 may consider using at least one DL RU in a broadcast mode to send several MAC data frames, each with a dedicated TRS subfield, to several non-AP stations respectively. The DL broadcast RU is thus allowed to trigger several and distinct UL RUs during the next UL transmission (having a signalled duration 1099).

In case the synchronization frame plays the role of a subsequent trigger frame to trigger a subsequent timeslot, the frame schedules only the duration and the BSS2 reservation of the shared frequency band (20 MHz secondary channel—RU5), while the TRS is used in a complementary fashion to refine the RU allocation (for the coordinated BSS) inside the obtained shared frequency band (e.g. RU5).

As a result of the disclosed embodiment, all the transmission sequences (and especially PHY preambles, through at least the pre-HE modulated fields 400A) are fully aligned in time.

Although the present invention has been described here-inabove with reference to specific embodiments, the present invention is not limited to the specific embodiments, and modifications will be apparent to a skilled person in the art which lie within the scope of the present invention.

In particular, the different HE frame formats described from different embodiments may be replaced by EHT frame formats, where appropriate.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appro-priate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network com-prising, at a device of a coordinated group of wireless devices:

receiving a resource sharing frame granting a transmis-sion opportunity, TXOP, to a coordinator device man-aging a separate coordinator group of wireless devices, the resource sharing frame allocating, for an allocation duration, a shared frequency band of the granted TXOP to the coordinated group;

exchanging, during the allocation duration, data over the allocated shared frequency band with one or more devices of the coordinated group;

wherein a synchronization frame initiated by the coordi-nator device is received on the allocated shared fre-quency band at a predefined sync time within the allocation duration, after the data exchange, and wherein upon detecting the received resource sharing frame includes a sync field indicating that a synchro-nization frame is expected at the predefined sync time, the device waits for the synchronization frame before starting again exchanging data over the allocated shared frequency band with the one or more devices of the coordinated group.

2. The method of claim 1, wherein the predefined sync time is defined in the received resource sharing frame.

3. The method of claim 1, wherein a subsequent synchro-nization frame initiated by the coordinator device is received over the allocated shared frequency band, at a subsequent predefined sync time within the allocation duration, the subsequent predefined sync time being defined in the pre-ceding received synchronization frame.

4. The method of claim 1, further comprising, at the device, repeating the received synchronization frame.

5. The method of claim 1, wherein the synchronization frame is received from a coordinated device managing the coordinated group.

6. The method of claim 1, wherein the synchronization frame is received from the coordinator device.

7. The method of claim 1, wherein further comprising, at the device, sending an acknowledgment frame to the coor-dinator device in response to the received synchronization frame.

8. A wireless communication device comprising at least one microprocessor configured for carrying out the steps of the method of claim 1.

9. A non-transitory computer-readable medium storing a program which, when executed by a microprocessor or computer system in a wireless device, causes the wireless device to perform the method of claim 1.

* * * * *